(12) United States Patent
Wang et al.

(10) Patent No.: US 10,496,638 B2
(45) Date of Patent: Dec. 3, 2019

(54) SYSTEMS AND METHODS FOR PRIVACY-ASSURED SIMILARITY JOINS OVER ENCRYPTED DATASETS

(71) Applicant: City University of Hong Kong, Kowloon (HK)

(72) Inventors: Cong Wang, Shatin (HK); Sarana Nutanong, Tsim Sha Tsui (HK); Xingliang Yuan, Shatin (HK); Xinyu Wang, Shatin Park (HK); Chenyun Yu, ShenZhen (CN)

(73) Assignee: City University of Hong Kong, Kowloon (HK)

( * ) Notice: Subject to any disclaimer, the term of this patent is extended or adjusted under 35 U.S.C. 154(b) by 128 days.

(21) Appl. No.: 15/371,953

(22) Filed: Dec. 7, 2016

(65) Prior Publication Data

US 2018/0157703 A1 Jun. 7, 2018

(51) Int. Cl.
*G06F 17/30* (2006.01)
*G06F 16/2453* (2019.01)
(Continued)

(52) U.S. Cl.
CPC ........ *G06F 16/2453* (2019.01); *G06F 16/215* (2019.01); *H04L 9/14* (2013.01);
(Continued)

(58) Field of Classification Search
CPC ......... G06F 21/6254; G06F 2221/2107; G06F 17/30303; G06F 17/30312;
(Continued)

(56) References Cited

U.S. PATENT DOCUMENTS 5,987,468 A 11/1999 Singh et al.
6,721,754 B1 4/2004 Hurst et al.
(Continued)

OTHER PUBLICATIONS

F. Baldimtsi et al. Sorting and searching behind the curtain. In Proc of FC, 2015.
(Continued)

*Primary Examiner* — Dangelino N Gortayo
(74) *Attorney, Agent, or Firm* — Norton Rose Fulbright US LLP

(57) ABSTRACT

Systems and methods which provide secure queries with respect to encrypted datasets are described. Embodiments provide privacy-assured similarity join techniques operable with large-scale encrypted datasets. A privacy-assured similarity join technique of embodiments enables a storage system to answer similarity join queries without learning the content of the query dataset and the target dataset. One or more secure query schemes may be implemented in accordance with a privacy-assured similarity join technique herein. For example, embodiments may utilize an individual similarity query scheme, a frequency hiding query scheme, and/or a result sharing query scheme. A particular secure query scheme of the foregoing secure query schemes may be utilized to address different considerations with respect to security, efficiency, and deployability with respect to various applications and scenarios with different requirements.

29 Claims, 7 Drawing Sheets

(51) Int. Cl.
*H04L 9/14* (2006.01)
*G06F 16/215* (2019.01)
*G06F 16/22* (2019.01)
*G06F 21/62* (2013.01)
*G06F 16/21* (2019.01)
*G06F 16/31* (2019.01)

(52) U.S. Cl.
CPC ............ *G06F 16/217* (2019.01); *G06F 16/22* (2019.01); *G06F 16/316* (2019.01); *G06F 21/6227* (2013.01)

(58) Field of Classification Search
CPC ......... G06F 17/30533; G06F 17/30321; G06F 17/30466; G06F 17/30536; G06F 17/30867; G06F 21/6227; G06F 16/215; G06F 16/22; G06F 16/245; G06F 16/2458; G06F 16/316; G06F 16/217; G06F 16/2228; G06F 16/2255; H04L 9/008; H04L 63/0428
USPC ................ 707/769, 698, 714, 741, 747, 780
See application file for complete search history.

(56) References Cited

U.S. PATENT DOCUMENTS

| 7,167,868 | B2 | 1/2007 | Shin | |
|---|---|---|---|---|
| 7,865,505 | B2 | 1/2011 | Arasu et al. | |
| 8,117,213 | B1 | 2/2012 | Nakano et al. | |
| 8,515,964 | B2 | 8/2013 | Ravikumar et al. | |
| 8,832,427 | B2* | 9/2014 | Roeder ................. | G06F 21/602 713/150 |
| 8,914,316 | B2 | 12/2014 | Tengli et al. | |
| 9,442,980 | B1* | 9/2016 | Trepetin ............ | G06F 17/30477 |
| 2004/0243816 | A1* | 12/2004 | Hacigumus ....... | G06F 17/30471 713/193 |
| 2008/0313128 | A1* | 12/2008 | Arasu ............... | G06F 17/30312 |
| 2009/0300351 | A1* | 12/2009 | Lei ........................ | H04L 9/0894 713/165 |
| 2013/0091120 | A1 | 4/2013 | Ganjam ............. | G06F 16/2458 707/714 |
| 2016/0119119 | A1* | 4/2016 | Calapodescu ............. | H04L 9/30 380/30 |
| 2017/0170960 | A1* | 6/2017 | Shaked ............... | H04L 63/0442 |
| 2017/0374093 | A1* | 12/2017 | Dhar .................. | H04L 63/1433 |

OTHER PUBLICATIONS

A. Boldyreva et al. Efficient fuzzy search on encrypted data. In Proc. of FSE, 2014.
A. Boldyreva et al. Order-preserving encryption revisited: Improved security analysis and alternative solutions. In Proc. of CRYPTO, 2011.
D. Cash et al. Leakage-abuse attacks against searchable encryption. In Proc. of ACM CCS, 2015.
D. Cash et al. Dynamic searchable encryption in very large databases: Data structures and implementation. In Proc. of NDSS, 2014.
H. Cui et al. Enabling secure and effective near-duplicate detection over encrypted in network storage. In Proc. of IEEE INFOCOM. 2016.
R. Curtmola et al. Searchable symmetric encryption: improved definitions and efficient constructions. In Proc. of ACM CCS, 2006.
Y. Elmehdwi et al. Secure k-nearest neighbor query over encrytped data in outsourced environments. In Proc of IEEE ICDE, 2014.
J. Gan et al. Locality-sensitive hashing scheme based on dynamic collision counting. In Proc. of ACM SIGMOD, 2012.
Gartner. Cloud computing: a key initiative overview. Online at http://www.gartner.com/it/initiatives/pdf/KeyInitiativeOverview_CloudComputing.pdf, 2015.
F. Hahn et al. Searchable encryption with secure and efficient updates. In Proc. of ACM CCS, 2014.
S. Har-Peled et al. Approximate nearest neighbor. Towards removing the curse of dimensionality. Theory of computing, 8(1):321-350, 2012.
J. Hughes. Data breaches in the cloud: Who's responsible? Online at http://www.govtech.com/security/Data-Breaches-in-the-Cloud-Whos-Responsible.html, 2014.
M. Islam et al. Access pattern disclosure on searchable encryption: Ramification, attack and mitigation. In Proc. of NDSS, 2012.
S. Jarecki et al. Outsourced symmetric private information retrieval. In Proc. of ACM CCS, 2013.
S. Kamara et al. Dynamic searchable symmetric encryption. In Proc. of ACM CCS, 2012.
M. Kuzu et al. Efficient similarity search over encrypted data. In Proc. of IEEE ICDE, 2012.
M. Naveed et al. Inference attacks on property-preserving encrypted databases. In Proc. of ACM CCS, 2015.
R. Pagh Large-scale similarity joins with guarantees (invited talk). In Proc. of ICDT. 2015.
R. Pagh et al. I/o-efficient similarity join. In Proc. of ESA, 2015.
S. Rane et al. Privacy-preserving nearest neighbor methods: comparing signals without revealing them. IEEE Signal Processing Magazine, 30(2):18-28, 2013.
K. Ren et al. Security challenges for the public cloud. IEEE Internet Computing, 16(1):69-73, 2012.
D. Song et al. Practical techniques for searches on encrypted data. In Proc. of IEEE S&P, 2000.
W. Wang. Similarity join algorithms: An Introduction. In SEBD, vol. 8, 393 pages. 2008.
B. Yao et al. Secure nearest neighbor revisited. In Proc. of IEEE ICDE, 2013.
M. Yiu et al. Outsourced similarity search on metric data assets. IEEE TKDE, 24(2):338-352, 2012.
X. Yuan et al. Enabling privacy-assured similarity retrieval over millions of encrypted records. In Proc. of ESORICS. 2015.

* cited by examiner

SYSTEMS AND METHODS FOR PRIVACY-ASSURED SIMILARITY JOINS OVER ENCRYPTED DATASETS

TECHNICAL FIELD

The invention relates generally to dataset queries and, more particularly, to providing privacy-assured queries with respect to encrypted datasets.

BACKGROUND OF THE INVENTION

The creation, storage, and use of large amounts of digital data, such as records, media files, genome information, etc., has become nearly ubiquitous in today's world of processor-based devices in common use by businesses and individuals. The trend is to outsource the storage of data to public clouds (e.g., Internet based storage area networks (SANs), network attached storage (NAS) systems, federated storage system platforms, etc.) for its cost effectiveness and superior scalability. However, the use of cloud based storage is not without risk or disadvantage. For example, instances of data breaches, such as due to inadvertent release of data or as a result of malicious attacks, are not uncommon. Much of the data stored by cloud based storage systems is sensitive in nature (e.g., comprising financial data, genomic data, multimedia data, etc.) and thus such data breaches heighten the concerns regarding the threats of breaching individuals' privacy.

Accordingly, encryption has been utilized to provide protection of the data. In particular, the data is often encrypted prior to its being stored in cloud based, or even local, storage systems to ensure data confidentiality. Such data encryption, however, typically prevents storage or other systems from providing useful computations on the stored data. For example, although encrypting the data before outsourcing the storage to the cloud based system generally renders the data useless if it is stolen by attackers or inadvertently released, encryption of the data also typically prevents cloud based storage systems from performing many different kinds of useful computations and operations on the data.

Some prior attempts have been made to provide a level of operations on encrypted data as may be stored by cloud based storage systems. For example, systems designed for keyword query over encrypted data (e.g., that can handle some SQL queries directly over the encrypted data records) have been provided by the CryptDB system developed by MIT Lincoln Laboratory (see Raluca Ada Popa, Catherine Redfield, Nickolai Zeldovich, and Hari Balakrishnan, Cryptdb: protecting confidentiality with encrypted query processing. In *Proc. of ACM SOSP*. ACM, 2011), Encrypted BigQuery developed by Google, and an encrypted cloud database system developed by SAP (see Florian Kerschbaum, Searching over encrypted data in cloud systems. In *Proc. of ACM SACMAT. ACM*, 2013). However, these prior attempts do not address similarity join query processing and instead focus on data with ordinary forms like texts and numbers.

BRIEF SUMMARY OF THE INVENTION

The present invention is directed to systems and methods which provide secure queries with respect to encrypted datasets. In particular, embodiments provide a privacy-assured similarity join technique operable with large-scale encrypted datasets, such as may comprise datasets widely used in financial services, bioinformatics, image processing, multimedia services, etc. In operation according to embodiments of the invention, a privacy-assured similarity join technique implemented in accordance with the concepts herein enables a storage system (e.g., public cloud based storage system or a local storage system) to answer similarity join queries without learning the content of the query dataset and the target dataset. For example, the privacy-assured similarity join technique of embodiments enables cloud based storage systems to find pairwise encrypted similar data records without learning the content of the query dataset and the target dataset.

Embodiments implementing a secure query technique utilize a plurality of modules, including a module for the data owners, a module for the data users, and a storage system side module. The module for the data owners utilized according to embodiments transfers a dataset to ciphertext which, is indexed in an encrypted data structure. For example, an encrypted similarity index may be utilized that achieves strong data protection, low query latency, high processing throughput, and guaranteed result quality. The module for the users utilized according to embodiments generates secure queries from a query dataset, and the module on the storage system side utilized according to embodiments processes the secure queries and returns encrypted candidates. Utilization of such modules according to embodiments facilitates implementations of a privacy-assured similarity join technique in delicate security protocols. For example, embodiments of the present invention utilizing implementations of the foregoing modules provide an encrypted similarity index that achieves strong data protection, low query latency, high processing throughput, and guaranteed result quality, provide protection of query dataset distribution, and/or provide improved client system and storage system performance.

Privacy-assured similarity join techniques implemented in accordance with concepts herein enable computations over encrypted data that ensure the data confidentiality without compromising the functionalities and services that may be provided. Accordingly, a privacy-assured similarity join technique implemented according to embodiments of the invention utilizes a cryptographic technique to protect content stored by a storage system. For example, embodiments may utilize a cryptographic technique called searchable encryption (e.g., searchable symmetric encryption (SSE)) that provides a fast and secure algorithm for encrypted similarity search.

In operation of a privacy-assured similarity join technique of embodiments, query dataset distribution is protected through enhanced security strength while client and cloud side performance is improved. Accordingly, a privacy-assured similarity join technique implemented according to embodiments of the invention utilizes one or more query schemes designed to protect the query dataset distribution, preferably while improving the query efficiency. A secure query scheme as may be implemented according to embodiments conducts secure individual similarity queries for all the query points one by one, wherein the storage system may directly return high quality candidates via collision counting (e.g., using Collision Counting LSH (C2LSH)). Another secure query scheme as may be implemented according to some embodiments of the invention is a frequency hiding query scheme adapted to protect the query dataset by leveraging a local cache (e.g., local to a data user query client system) to keep the intermediate results for queried tokens. Yet another secure query scheme as may be implemented according to embodiments of the invention is a result sharing query scheme, wherein it is assumed that the query points in proximity are likely to yield similar or even the same result sets (e.g., candidates to a query point can be treated as approximate results for its nearby points in the query dataset), adapted to facilitate security and efficiency simultaneously. A particular secure query scheme of the foregoing secure query schemes may be utilized to address different considerations with respect to security, efficiency, and deployability with respect to various applications and scenarios with different requirements.

In accordance with embodiments of the invention, a method for providing secure queries of encrypted datasets is provided. The method of embodiments includes storing an encrypted similarity index for a source dataset, processing secure tokens of a secure query using a similarity join process on the encrypted similarity index to identify one or more pairwise encrypted similar data records, wherein the secure tokens are generated from a query dataset, and identifying a pairwise encrypted similar data record of the one or more pairwise encrypted similar data records as a candidate pair for indicating data of the encrypted dataset relative to the secure query without learning content of the query dataset and the source dataset.

In accordance with further embodiments of the invention, a system for providing secure queries of encrypted datasets. The system of embodiments includes an encrypted similarity index for a source dataset stored by a storage system, and storage system server logic configured to cause one or more processors of the storage system server to process secure tokens of a secure query using a similarity join process on the encrypted similarity index, to identify one or more pairwise encrypted similar data records, and to identify a pairwise encrypted similar data record of the one or more pairwise encrypted similar data records as a candidate pair for indicating data of the encrypted dataset relative to the secure query without learning content of the query dataset and the source dataset, wherein the secure tokens are generated from a query dataset.

In accordance with still further embodiments of the invention, a method for providing secure queries of encrypted datasets. The method of embodiments includes storing an encrypted similarity index for a source dataset, wherein the similarity index is generated using a locality-sensitive hashing (LSH) based inverted index and an encrypted dictionary searchable symmetric encryption (SSE), processing secure tokens of a secure query using a similarity join process on the encrypted similarity index to identify one or more pairwise encrypted similar data records from collided data points, wherein the secure tokens are generated from a query dataset using LSH hash values of query points of the query dataset, and identifying a pairwise encrypted similar data record of the one or more pairwise encrypted similar data records as a candidate pair using a predefined threshold of collisions for a data point of the collided data points.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
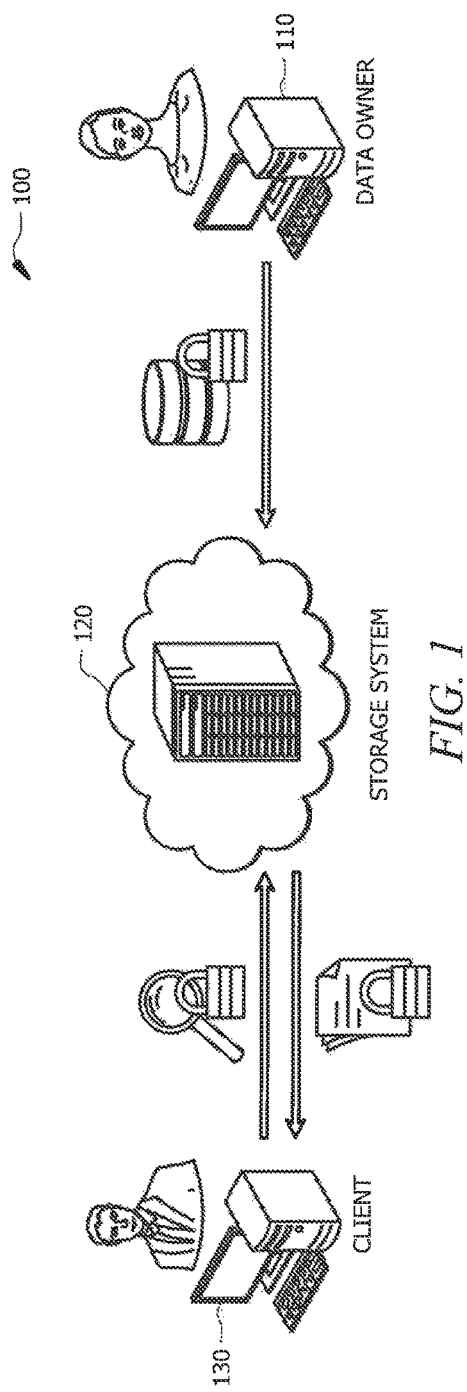
FIG. 1 shows a system adapted to provide secure queries with respect to encrypted datasets according to embodiments of the present invention.

Similarity queries in high-dimensional spaces have been proposed to handle an ever-increasing amount of imprecise data (see S. Har-Peled, P. Indyk, and R. Motwani, "Approximate nearest neighbor: Towards removing the curse of dimensionality"*Theory of computing,* 8(1):321-350, 2012, the disclosure of which is incorporated herein by reference). However, data security and privacy concerns have not traditionally been addressed in with respect to similarity search on high-dimensional data for data processing and analysis, particularly in the context of data outsourcing such as the storage of data to public clouds (see X, Yuan, H. Cui, X. Wang, and C. Wang, "Enabling privacy-assured similarity retrieval over millions of encrypted records,"*In Proc. of ESORICS,* 2015, the disclosure of which is incorporated herein by reference). In general, the data is directly stored without protection in off-premise storage, such as public clouds, where data breaches may occur frequently in today's computing environment.

In outsourcing environments, like the public cloud, data breaches might result from cloud service providers or outside adversaries wanting to learn valuable information from the source dataset and/or the query dataset (see S. Rane and P. T. Boufounos, "Privacy-preserving nearest neighbor methods; comparing signals without revealing them," *IEEE Signal Processing Magazine*, 30(2):18-28, 2013, the disclosure of which is incorporated herein by reference). Similarly, some organizations (e.g., hospitals and banks) keep their data at local datacenters, such as may comprise private clouds, wherein the data still needs to be encrypted to achieve in-depth defense. Further, the legitimate users may want to keep their queries secret from not only the cloud but also the data owner for privacy protection. Therefore, after leaving the data owner and the user client, the data and the queries should be fully protected, whereby the data remains secure even if the data is stolen or mishandled to unauthorized users.

To aid in understanding the concepts of the present invention, exemplary data query scenarios are provided for a showing the environment in which embodiments herein may be implemented. In particular, examples illustrating scenarios for the foregoing security and privacy protection are given below to aid in visualizing applicability of secure query techniques according to the concepts herein. It should be appreciated, however, that such data query scenarios are not intended to be limiting with respect to the applicability of the concepts herein, but are instead merely provided to assist the reader in envisaging embodiments of the invention.

In an exemplary data query scenario in which a secure query technique of embodiments of the invention may be implemented, a data owner may outsource a high-dimensional dataset to the public cloud (e.g., storing the source dataset on an Internet based storage system), such as for cost efficiency. Subsequently, a user may send a query dataset to the storage system cloud server and request that a query be conducted over the source dataset (e.g., to find all similar pairwise data points between two datasets).

In a first application scenario, providing a usage case enabling secure financial services, financial historical data may be encrypted and stored on the cloud, for example, whereby financial institutions can conduct some encrypted and privacy-preserving pairwise comparison between the data generated by their proprietary quantitative financial algorithms and the encrypted historical data. The comparison results could be used for improving and fine tuning their algorithms, as one example. In operation of embodiments of the present invention, the algorithms of the financial institutes are protected from being analyzed by the cloud based on the queried data and the comparison results. Moreover, data stored on the cloud that is irrelevant to the queries will not be released to the financial institutions according to embodiments.

In a second application scenario, providing a usage case enabling privacy-assured cloud genomic services, genomic datasets (e.g., hosted on the public cloud for cost effectiveness and to facilitate access by the public for research or medical purposes) may comprise perabytes of data (e.g., genomic sequences) for thousands of patients. However, such genomic data is extremely sensitive. In operation of embodiments of the present invention, a doctor can submit encrypted queries generated from patients' genomic sequences to an encrypted disease genomic datasets hosted in the cloud, and then the cloud returns encrypted candidates so that the doctor can learn which diseases each patient might have. During the query processing provided according to embodiments, the cloud knows nothing about the source dataset and the query datasets.

In a third application scenario, providing a usage case enabling privacy-preserving cloud based image processing and retrieval services, a massive amount of image sets and image-centric applications hosted by the cloud is made available to users. Images are semantically rich, which will expose personal information if they are leaked. Using medical applications as an example, physicians interested in finding certain pathologies may want to rely on the cloud to search through existing image samples for possible matching results. However, for security consideration, both image samples and users' queries should be encrypted before sending to the cloud. In operation of embodiments of the present invention, cloud based systems are enabled to search through encrypted image samples without decrypting them. Such operation provided according to embodiments can be readily extended to a variety of scenarios where conducting similarity-join over two image datasets needs to be supported. In particular, embodiments of the invention can be adopted by a diverse range of areas, covering different kinds of broadly-defined high-dimensional data sets and related applications.

Although similarity queries may be useful in the foregoing exemplary and other scenarios, it can readily be appreciated that the source datasets and the query datasets can be sensitive or proprietary. For privacy concerns, the data owner may thus encrypt the source datasets before uploading the source datasets to the cloud. Thus, embodiments of the present invention are adapted to enable secure similarity queries with respect to such encrypted source datasets, preferably utilizing implementations that provide a balance with respect to security, efficiency and accuracy.

In order to address privacy and security concerns while preserving the query functionality, embodiments of the present invention provide secure query techniques, including privacy-assured queries, with respect to encrypted datasets. Accordingly, strong data protection is achieved according to embodiments by encryption techniques. A private-key encryption scheme as may be utilized according to embodiments is a tuple of probabilistic polynomial-time algorithms (KGen; Enc; Dec). The key generation algorithm KGen takes a security parameter $\lambda$ to return a secret key K that satisfies $|K| \geq \lambda$. The encryption algorithm Enc takes a key K and a message $m \in \{0,1\}^*$ to return a ciphertext $c \in \{0,1\}^*$. The decryption algorithm Dec takes K and c to return m.

In utilizing a private-key encryption scheme according to embodiments of the invention a family of pseudo-random functions (PRF) F may be defined such that PRF F: $\{0,1\}^* \times \{0,1\}^* \to \{0,1\}^*$, if for all probabilistic polynomial-time distinguishers D, $|\Pr[D^{F(K,\cdot)}(1^n)=1] - \Pr[D^{f(\cdot)}(1^n)=1]| < \text{negl}(n)$, where negl(n) is a negligible function in $K \in \{0,1\}^n$, $f$ is a uniform choice of $\text{Func}_n$. A PRF F(K; x) on the input value of x is called oblivious (OPRF) (see S. Jarecki, C. Jutla, H. Krawczyk, M. Rosu, and M. Steiner, "Outsourced symmetric private information retrieval," *In Proc. of ACM CCS*, 2013, the disclosure of which is incorporated herein by reference), if there is a two party computation protocol such that A inputs K and B inputs x, and then B learns the output of F(K; x) but A learns nothing. Embodiments of the present invention adopt a simple OPRF implementation, defined as $F(K; x) = H(X)^K$, where H is a hash function onto $G \setminus \{1\}$ where G is a group of prime order p, and K is randomly selected in $Z^*_p$. In operation according to embodiments, B sends $a = H(x)^r$ for random r in $Z^*_p$, A sends back $b = a^K$, and B computes $H(x)^K$ as $b^{1/r}$.

It should be appreciated, however, that enabling similarity queries over encrypted data presents challenges. Accordingly, embodiments utilize locality-sensitive hashing (LSH) (see S. Har-Peled, P. Indyk, and R. Motwani, "Approximate nearest neighbor: Towards removing the curse of dimensionality," *Theory of computing*, 8(1):321-350, 2012) and searchable symmetric encryption (SSE) (see R. Curtmola, J. Garay, S. Kamara, and R. Ostrovsky, "Searchable symmetric encryption: improved definitions and efficient constructions," *In Proc. of ACM CCS*, 2006, the disclosure of which is incorporated herein by reference) to facilitate secure similarity joins according to concepts herein.

LSH is a randomized approximation algorithm for efficient similarity search in high-dimensional spaces (see S, Har-Peled, P. Indyk, and R. Motwani, "Approximate nearest neighbor: Towards removing the curse of dimensionality," *Theory of computing*, 8(1):321-350, 2012). The idea is to hash the high-dimensional data points via a family of "distance-preserving" LSH functions, where similar ones have hash collisions with a higher probability than those that are far apart. For example, let $\mathcal{O}$ be the domain of data points and Dist be the distance function, and given distance $R_1$, $R_2$, where $R_1 < R_2$, and probability $p_1$, $p_2$, where $p_1 > p_2$, a function family $\mathcal{H} = \{h: \mathcal{O} \rightarrow \mathcal{U}\}$ is $(R_1, R_2, p_1, p_2)$-locality-sensitive if for any $o_i$, $o_j \in \mathcal{O}$: if $\text{Dist}(o_i, o_j) \leq R_1$ then $P[h(o_i) = h(o_j)] \geq p_1$; if $\text{Dist}(o_i, o_j) > R_2$ then $P[h(o_i) = h(o_j)] \leq p_2$. Various constructions of LSH functions have been proposed for different distance metrics, such as Hamming distance, Cosine distance, and Euclidean distance (see S. Har-Peled, P. Indyk, and R. Motwani, "Approximate nearest neighbor: Towards removing the curse of dimensionality," *Theory of computing*, 8(1):321-350, 2012).

A similarity query may be conducted through multiple LSH hash table lookups according to embodiments of the invention. For example, in accordance with embodiments implementing the aforementioned combination of LSH and SSE, LSH hash values may be regarded as search "keywords" (see M. Kuzu, M. S. Islam and M. Kantarcioglu, "Efficient similarity search over encrypted data," *In Proc. of IEEE ICDE*, 2012, the disclosure of which is incorporated herein by reference, and X. Yuan, H. Cui, X. Wang, and C. Wang, "Enabling privacy-assured similarity retrieval over millions of encrypted records," *In Proc. of ESORICS* 2015), and the framework of SSE is applied to realize secure similarity search in the way of secure exact match queries.

It should be appreciated that the join results in the foregoing combination of LSH and SSE are likely to contain "false positives" (i.e., distant pairs) because LSH is an approximate algorithm. Although such false positives can simply be filtered in a non-encrypted scenario by checking the distances of all candidate pairs (see S. Har-Peled, P. Indyk, and R. Motwani, "Approximate nearest neighbor: Towards removing the curse of dimensionality," *Theory of computing*, 8(1):321-350, 2012), computing distances on encrypted data can be too expensive. Moreover, retrieving all candidates back to the client query system also introduces local computation and bandwidth burdens. Accordingly, to avoid computing distances over large candidate sets, embodiments of the present invention utilize a Collision Counting LSH (C2LSH) algorithm (see J. Gan, J. Feng, Q. Fang, and W. Ng, "Locality-sensitive hashing scheme based on dynamic collision counting," *In Proc. of ACM SIGMOD*, 2012, the disclosure of which is incorporated herein by reference). C2LSH implemented according to embodiments has a guaranteed query quality based on a tunable threshold of hash collisions. For example, as long as the number of collisions between a data point and a query point is greater than the threshold, they are regarded as a candidate pair. Based on this collision counting approach, the collided data points can be filtered without checking the distances. Accordingly, such a C2LSH algorithm of embodiments herein derives high quality candidates based on the number of LSH collisions, wherein collided data points will be filtered if the number of collisions to the query point is less than a pre-defined threshold. The overhead of post processing in accordance with embodiments utilizing C2LSH can thus be reduced.

Additionally, embodiments herein utilize a LSH-based inverted index where each LSH hash value links to a list of identifiers of collided data points. The LSH-based inverted index may be transformed into an encrypted dictionary (see D. Cash, J. Jaeger, S. Jarecki, C. Jutla, H. Krawczyk, M.-C. Rosu, and M. Steiner, "Dynamic searchable encryption in very large databases: Data structures and implementation," *In Proc. of NDSS*, 2014, the disclosure of which is incorporated herein by reference), wherein secure similarity queries can be facilitated according to embodiments by processing tokens on the encrypted dictionary without revealing the content of query points and data points.

The strong requirement on security and the dimensionality makes the secure query processing more complex and expensive for high-dimensional data, not to mention that the datasets could contain millions of records. Similarity join, which aims at finding pairwise similar data between two datasets, is a direct primitive of similarity queries that is well suited to deal with high-dimensional data or the data records with multiple attributes. In particular, a similarity join query identifies pairs of sets from multiple collections of sets that have high overlap. The similarity join problem between a source data set S and a query dataset $\mathcal{Q}$ may be defined as $Q \bowtie_R S = \{(q, s) | \text{Dist}(q, s) \leq R\}$, were $q \in Q$, $s \in S$, Dist is the distance function, and R is the distance threshold. In operation according to embodiments of the invention, a similarity join technique implemented in accordance with the concepts herein enables a storage system (e.g., public cloud based storage system, a local storage system, or other storage system configuration) to answer similarity join queries without learning the content of the query dataset and the target dataset.

Secure similarity joins may be implemented by embodiments of the invention utilizing one or more secure query schemes. As discussed in further detail herein, secure query schemes of the one or more secure query schemes may address different considerations with respect to security, efficiency, and deployability, such as for providing flexibly for applications and scenarios with different requirements. For example, embodiments of the present invention provide different secure similarity join query schemes, with specialized query strategies, based on different requirements on security, efficiency and deployability.

One secure query scheme (referred to herein as an individual similarity query scheme) as may be implemented according to embodiments conducts secure individual similarity queries for all the query points one by one. For example, similarity joins can be provided according to embodiments via securely processing all the individual points in the query dataset Q over the encrypted source dataset S. Such a query scheme provides an advantage in that the query scheme may be relatively easily deployed (e.g., no extra storage resource is needed at the client). In operation of an individual similarity query scheme, the storage system may directly return high quality candidates via collision counting (e.g., using C2LSH). However, an individual similarity query scheme may present disadvantages with respect to security and efficiency. For example, the query dataset can be a proprietary dataset and iterating all the query points discloses the distribution X of the query dataset, due to the intrinsic leakage of SSE (i.e., deterministic query tokens show the repeatability of searched keywords). In the foregoing dataset query context, repeated LSH hash values indicate the repeated query tokens and the overlapped tokens between query points tell their similarity. Accordingly, the histogram of distinct token occurrences is fully revealed. Such auxiliary information may be exploited to compromise the confidentiality of the query dataset (see M. Islam, M. Kuzu, and M. Kantarcioglu, "Access pattern disclosure on searchable encryption: Ramification, attack and mitigation,"*In Proc. of NDSS,* 2012 and M. Naveed, S. Kamara, and C. V. Wright, "Inference attacks on property-preserving encrypted databases,"*In Proc. of ACM CCS,* 2015, the disclosure of which are incorporated herein by reference), particularly when the adversary knows partial or full knowledge of the query dataset (see D. Cash, P. Grubbs, J. Perry, and T. Ristenpart, "Leakage-abuse attacks against searchable encryption,"*In Proc. of ACM CCS,* 2015, the disclosure of which is incorporated herein by reference). Accordingly, although such a query scheme can achieve adaptive security against chosen-keyword attacks (CKA2), the storage system may nevertheless be able to obtain information about clusters of similar points in the query dataset.

Moreover, processing all the individual points in the query dataset over the encrypted dataset is not readily scalable to large-scale query datasets. For example, assuming a query dataset with size of m, the time complexity will be O(lm) for l LSH functions, where l can be as large as several hundreds to achieve high search accuracy (see J. Gan, J. Feng, Q. Fang, and W. Ng, "Locality-sensitive hashing scheme based on dynamic collision counting,"*In Proc. of ACM SIGMOD,* 2012). Further, the total cost increases linearly with the growth of query dataset size.

Another secure query scheme as may be implemented according to some embodiments of the invention is adapted to provide strong protection of the query dataset. In particular, to facilitate improved security strength, a secure similarity join query scheme (referred to herein as a frequency hiding query scheme) is adapted to implement queries such that the storage system only sees the flattened distribution. For example, a frequency hiding query scheme of embodiments is operable to maintain a local store at the client to cache the intermediate results $R^1$. Such a frequency hiding query scheme of embodiments protects the query dataset by leveraging a local cache (e.g., local to a data user query client system) to keep the intermediate results for queried tokens. In operation of such an embodiment, before a token is sent for querying the storage system, the local cache may be checked, and only new tokens sent to and processed by the storage system. Accordingly, only newly appeared tokens may be processed, and the returned ids merged locally to provide final candidate pairs. As a result, the storage system only sees the distinct tokens. Such a frequency hiding query scheme of embodiments not only fully hides the query dataset distribution, but also protects the similarity between query points. However, despite being more secure than the aforementioned individual similarity query scheme, the frequency hiding query scheme of the foregoing example utilizes a local cache resulting in the local query client consuming additional storage resources for caching and computation resources for collision counting. Accordingly, embodiments of this query scheme flatten the token frequency but may demand a large amount of computation and storage resources at the client. Moreover, like the individual similarity query scheme discussed above, the frequency hiding query scheme does not scale well for large query datasets.

Yet another secure query scheme as may be implemented according to embodiments of the invention is adapted to achieve security and efficiency simultaneously. In particular, to facilitate reduced client cost (e.g., with respect to computation and storage resources at the client) while obfuscating the distribution X, a secure similarity join query scheme (referred to herein as a result sharing query scheme) implemented according to embodiments processes only a small portion of query points and shares the results with other nearby points, to facilitate security and efficiency simultaneously. In arriving at the result sharing query scheme of embodiments, it is assumed that the query points in proximity are likely to yield similar or even the same result sets (e.g., candidates to a query point can be treated as approximate results for its nearby points in the query dataset). Based on this principle, a result sharing query scheme provided according to embodiments herein is adapted to enable the query client to select "representative" query points via self-queries rather than all the points in the query dataset. For example, a result sharing query scheme implemented according to embodiments is operable to utilize a result sharing wherein the client conducts a self-query q to get similar points $\{q_s\}$, which share the results of q. Operation according to embodiments of this query scheme will not stop until all the query points have been covered by self-queries and, as a result, the server can still perform the collision counting, and the redundancy of queries will greatly be reduced. It should be appreciated that X is hardly predicable because query tokens that appeared before will not likely appear again after self query filtering of embodiments of the result sharing query scheme. The query performance will be greatly improved in operation of embodiments of such a result sharing query scheme. Moreover, as the similarity points will not likely to be all selected as "representative" query points, the query dataset distribution is naturally obfuscated such that peaky tokens with high occurrences will be concealed.

FIG. 1 shows system 100 adapted to provide secure queries with respect to encrypted datasets utilizing one or more of the foregoing secure query schemes according to embodiments of the present invention. System 100 of the illustrated embodiment comprises data owner system 110, storage system 120, and client system 130. Data owner system 110 of embodiments provides a system utilized by a data owner (e.g., a business entity, individual, data compilation entity, etc.) that has the source dataset (e.g., financial data, genomic data, multimedia data, etc.) for which privacy-assured queries may be provided according to the concepts herein. Storage system 120 (e.g., a cloud based or local storage system, such as may comprise one or more SANs, NAS systems, federated storage system platforms, file servers, storage device arrays, etc.) of embodiments provides storage infrastructure operable to facilitate the storage of and authorized access to the source data set. Client system 130 of embodiments provides a system utilized by an authorized user of the source dataset.

Data owner system 110, storage system 120, and client system 130 of system 100 may comprise processor-based systems (e.g., servers, personal computers (PCs), personal digital assistants (PDAs), smartphones, tablet devices, Internet of things (IoT) devices, etc.) operable to facilitate secure similarity join functionality in accordance with the concepts herein. Data owner system 110, storage system 120, and client system 130 of embodiments may, for example, comprise a processor-based system architecture having one or more processors, system bus, memory, input interface, and output interface. The one or more processors may comprise processing units, such as a central processing unit (CPU) (e.g., a processor from the Intel CORE family of multi-processor units), a field programmable gate array (FPGA), and/or an application specific integrated circuit (ASIC), operable under control of one or more instruction sets defining logic modules configured to provide operation as described herein. The system bus may couple various system components, such as the memory, input interface, and/or output interface to the processor(s). Accordingly, the system bus of embodiments may be any of various types of bus structures, such as a memory bus or memory controller, a peripheral bus, and/or a local bus using any of a variety of bus architectures. Additionally or alternatively, other interface and bus structures, such as a parallel port, game port or a universal serial bus (USB) may be utilized. The memory may comprise various configurations of volatile and/or non-volatile computer-readable storage media, such as RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. The input interface may be operable to facilitate coupling one or more input components or devices to the processor(s). For example, a user may enter commands and information into a respective one of data owner system 110, storage system 120, or client system 130 through one or more input devices (e.g., a keypad, microphone, digital pointing device, touch screen, etc.) coupled to the input interface. The output interface may be operable to facilitate coupling one or more output components or devices to the processor(s). For example, a user may be provided output of data, images, video, sound, etc. from a respective one of data owner system 110, storage system 120, or client system 130 through one or more output devices (e.g., a display monitor, a touch screen, a printer, a speaker, etc.) coupled to the output interface. The output interface of embodiments may additionally or alternatively provide an interface to other electronic components, devices and/or systems (e.g., a memory, a video decoder, a radio transmitter, a network interface card, devices such as a computer, a laptop computer, a tablet device, a server, a dedicated spatial processing component or device, a smartphone, a PDA, an IOT device, a network equipment, a set-top-box, a cable headend system, a smart TV, etc.).

In operation of system 100 according to embodiments of the invention, a secure similarity join technique may utilize a plurality of modules, such as may be implemented by instruction sets, code segments, software, firmware, and/or other logic executed by the aforementioned processor-based platforms. Additionally or alternatively, some or all the functionality of such modules may be implemented in circuits adapted to provide functions described herein. The plurality of modules of a secure similarity join implementation of embodiments includes a module for the data owners (also referred to herein as a data owner module), a module for the data users (also referred to herein as a user module), and a storage system side module (also referred to as a cloud module). As discussed more fully below, the module for the data owners utilized according to embodiments transfers a dataset to ciphertext which is indexed in an encrypted data structure. For example, to facilitate secure similarity join queries, a setup procedure may be performed by a data owner module operable upon data owner system 110 to build an encrypted LSH-based index I and the source dataset S, and to upload the index and source dataset to storage system 120. The module for the users utilized according to embodiments generates secure queries from a query dataset. For example, in implementing secure similarity join queries, a user module operable upon client system 130 may preprocess the query dataset $Q$ and generate secure tokens t from LSH hash values of query points and provide some or all of the generated tokens in a query to storage system 120. The module on the storage system side utilized according to embodiments processes the secure queries and returns encrypted candidates. For example, in implementing secure similarity join queries, a cloud module operable upon storage system 120 may receive the tokens in a query from client system 130 and process the tokens over index I to get a set of ids of collided data points. In operation according to embodiments, when the number of data point's hash collisions to a query point is greater than a pre-defined collision threshold $\alpha$, they will be considered as a candidate pair and provided to client system 130 in a query response.

A setup procedure to facilitate secure similarity join queries, as may be performed by a data owner module operable upon data owner system 110, builds an encrypted LSH based similarity index to support subsequent secure similarity join queries, wherein the resulting encrypted LSH-based index I and the corresponding source dataset S are uploaded to storage system 120 for use in secure similarity join queries according to embodiments of the invention. Operation to build an encrypted LSH based similarity index I of embodiments follows the security framework of searchable symmetric encryption (SSE) (see R. Curtmola, J. Garay, S. Kamara, and R. Ostrovsky, "Searchable symmetric encryption: improved definitions and efficient constructions,"*In Proc. of ACM CCS*, 2006), wherein the encrypted index enables secure keyword lookup over encrypted data with sublinear time and achieves a strong security notion (e.g., security against adaptive CKA2). In operation according to embodiments, the LSH hash values are treated as keywords and, as a result, each data point will associate with l "keywords" for total l LSH functions. Accordingly, an inverted index can be built, where each distinct LSH hash value links to a list of matched data points. Embodiments of the invention thus adopt an encrypted dictionary SSE construction (see D. Cash, J. Jaeger, S. Jarecki, C. Jutla, H. Krawczyk, M.-C. Rosu, and M. Steiner, "Dynamic searchable encryption in very large databases: Data structures and implementation,"*In Proc. of NDSS*, 2014), which may be relatively easily implemented by system 100 and can be readily deployed in any generic hash table or key-value store.

Algorithm 1 below shows operation for construction of the encrypted index according to embodiments of the invention. An objective of the operation provided according to embodiments is to transform a LSH inverted index to a set of encrypted keys-value pairs that can be stored on top of any generic dictionary. Accordingly, for each data point $s_i$ in the source dataset S, the data owner may compute the LSH hash value LshV of each LSH hash function $h_j$. Two tokens $t_1$ and $t_2$ may be generated from LshV: $t_1 \leftarrow P_1(K_1, 1\|LshV\|j)$ and $t_2 \leftarrow P_2(K_2, 2\|LshV\|j)$, where $K_1$ and $K_2$ are private keys for PRF $P_1$ and $P_2$ respectively, and $1\|LshV\|j$ and $2\|LshV\|j$ are the concatenation to indicate that the tokens associate with the hash value of jth LSH function. A hash table C may be used to record the counter c for each LshV, which traces the number of matched data points to LshV. With the aid of c, the list of matched data points can be transformed to encrypted key-value pairs: $\langle F(t_1, c), Enc(t_2, id_i)\rangle$, where F is PRF and $id_i$ is the identifier of $s_i$. In the foregoing, $id_i$ is used rather than $s_i$, because $id_i$ is more compact and it suffices for collision counting of C2LSH. Accordingly, $s_i$ may be encrypted and stored separated in a data store S, where the ciphertext can be accessed by its id. In operation according to embodiments, S may be accessed to fetch the corresponding encrypted data points only if post processing is required.

---

Algorithm 1: Build encrypted dataset and encrypted index
Date: Private keys: $K = (K_1, K_2, K_3)$; Dataset:
$\quad S = \{s_1, \cdots, s_n\}$.
Result: Encrypted dataset S; encrypted index I.
1  Initialize hash tables I, C, and data store S;
2  for i ← 1 to n do
3  |  for j ← 1 to l do
4  |  |  LshV ← $h_j(s_i)$;
5  |  |  $t_1$ ← $P_1(K_1, 1 \| LshV\|j)$;
6  |  |  $t_2$ ← $P_2(K_2, 2 \| LshV\|j)$;
7  |  |  if C.get(LshV‖j) = null then
8  |  |  |  c ← 0
9  |  |  else
   |  |  |  c ← C.get(LshV‖j);
10 |  |  I.put(F($t_1$,c), Enc($t_2$,$id_1$));
11 |  |  c + +
12 |  |  C.put(LshV‖j,c);
13 |  S.put($id_1$, Enc($K_3$, $s_1$));

---

In implementations according to embodiments of the invention, C2LSH is treated as a blackbox LSH algorithm, and thus the parameter setting of C2LSH (see J. Gan, J. Feng, Q. Fang, and W. Ng, "Locality-sensitive hashing scheme based on dynamic collision counting,"*In Proc. of ACM SIGMOD*, 2012) may be directly adopted to derive the number of LSH functions l and the collision threshold α (discussed in further detail below). In operation to support various secure query schemes, such as the individual similarity query scheme, frequency hiding query scheme, and result sharing query scheme of embodiments, these system parameters may be notified to the storage system (e.g., in advance of secure query operation).

Having an encrypted LSH-based index land corresponding source dataset S on storage system 120, secure similarity join queries may be performed by one or more authorized user of the source dataset. For example, client system 130 may be utilized to initiate secure similarity join queries with respect to storage system 120 in accordance with one or more secure query schemes, such as an individual similarity query scheme, frequency hiding query scheme, and/or result sharing query scheme of embodiments herein.

An individual similarity query scheme (also denoted as $\Pi_1$ herein) of embodiments provides a basic secure query scheme implemented using a relatively straight-forward approach. From a high level point of view, the similarity join problem can be solved via individual LSH index lookups using each data point in the query dataset. In operation of an individual similarity query scheme of embodiments, the secure similarity join queries can be handled in the same logic.

Figure 2:
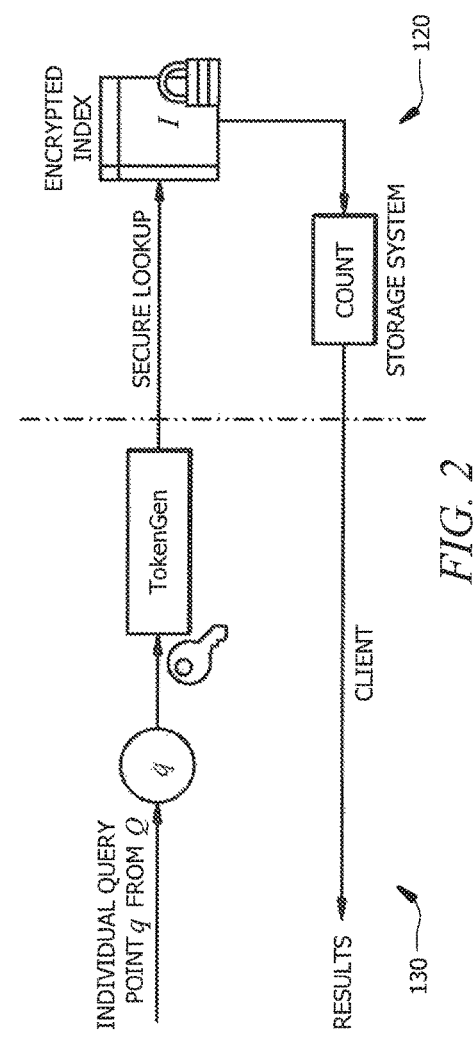
FIG. 2 illustrates operation of components of the system of FIG. 1 in accordance with an individual similarity query of embodiments of the invention.

FIG. 2 illustrates operation in accordance with an individual similarity query of embodiments of the invention, such as may be provided through functionality of one or more modules of storage system 120 and client system 130. In operation according to embodiments, client system 130 generates tokens via the one-way transformation of LSH hash values to provide protection of query points. Theses tokens may be sent to storage system 120 for secure lookup on the encrypted index, where only the identifiers of matched data points will be decrypted according to embodiments of the invention. Based on the number of LSH collisions between the given query point and the matched data points, storage system 120 may directly return the similar candidates.

Algorithm 2 below shows detailed operation of an individual similarity query as may be implemented according to embodiments of the invention. In operation according to Algorithm 2, for each query point $q_i$ in the query dataset $Q$, client system 130 computes its LSH hash values $\{LshV\}_l$ via l LSH functions, and generates tokens $t_1$ and $t_2$ from each LshV via $P_1(K_1, 1\|LshV\|j)$ and $P_2(K_2, 2\|LshV\|j)$. Storage system 120 receives $\{t_1, t_2\}l$ and processes them one by one. With $F(t_1, c)$, the matched buckets will be located in the encrypted index I, where c increments from 0 until I returns null. Storage system 120 decrypts the bucket to get the inside id with the decryption key t2. Accordingly, the number of the id's occurrences $f$ is cached and updated in another hash table T. If $f$ exceeds the collision threshold α, $q_{i,d}$ will be considered as a candidate and id will be added to a set R'. In other words, $s_{i,d}$ collides with $q_i$ sufficient times to indicate that they are likely very similar. After all the query points are processed, the secure similarity join query is completed, whereby each query point finds its similar candidates in the source dataset S.

---

Algorithm 2: Basic secure similarity join $\Pi_1$
Data: Private keys: $K = (K_1, K_2)$; Encrypted index: I;
$\quad$ Query set: $Q = \{q_1,...,q_m\}$; Hash table: T;
$\quad$ Empty set: R'.
Result: Pairwise similar data points R.
CLIENT:
1  for i ← 1 to m do
2  |  for j ← 1 to l do
3  |  |  LshV ← $h_j(q_i)$;
4  |  |  $t_1$ ← $P(K_1, 1 \| LshV\|j)$;
5  |  |  $t_2$ ← $P(K_2, 2 \| LshV\|j)$;
   |  |  SERVER:
6  |  |  c ← 0
7  |  |  while I.get(F($t_1$,c)) ≠ null do
8  |  |  |  id ← Dec($t_2$, I.get(F($t_1$,c)));
9  |  |  |  c + +
10 |  |  |  if T.get(id) = null then
11 |  |  |  |  T.put(id,0) ← 0;
12 |  |  |  else
   |  |  |  |  f ← T.get(id)
   |  |  |  |  T.put(id,f+ +);
13 |  |  |  if f > α then
14 |  |  |  |  add id to R';
   |  CLIENT:
15 |  $\forall id \in R'$: add ($q_i$,id) to R;

---

As discussed above, embodiments of the invention follow the security notion of SSE. Accordingly, an individual similarity query scheme of embodiments herein can achieve adaptive security against CKA2 under quantifiable leakage profiles. That is, the views of the storage system are formally defined in stateful leakage functions. Within a polynomial number of adaptive queries, the storage system only learns the information defined in leakage functions, and no other information about the underlying content of the query points and the source dataset. In particular, three leakage functions may be defined for the view of the encrypted index, the query pattern, and the access pattern. As long as the encrypted index I is uploaded, the storage system knows its capacity and size, which are captured in leakage function $L_1$, defined as $\mathcal{L}_1^{\Pi_1}(1) = (\ln, \langle |x|, |y|\rangle)$, where n is the size of the sourced dataset, l is the number of LSH functions, and (|x|, |y|) are the bit lengths of encrypted key-value pairs.

Unlike a secure keyword search, the query pattern utilized by an individual similarity query scheme of embodiments of the invention only indicates the repeated keywords from the same tokens. In particular, for the query points processed, the storage system can see the repeated tokens, the accessed key-value pairs and the matched candidate ids. In such secure similarity queries, the similarity between query points is known because of the overlapped tokens. The similarity query pattern may thus be determined by the context of LSH-based similarity search. The similarity query pattern $\mathcal{L}_2^{\Pi_1}$ is defined as $\mathcal{L}_2^{\Pi_1}(q_i) = (\{t_1(q_i)\}_l \cap \{t_1(q_j)\}_l, \forall j \in [1, i-1])$, where $q_i$ is the current query point, $\{t_1(q_i)\}_l$ are the tokens transformed from $\{LshV\}_l$ respectively, and $\{t_1(q_j)\}_l$ are the tokens for previous $q_j$. Because the tokens are generated via deterministic PRF according to embodiments, the same LSH values map to the same token. That is, if two similar query points share LSH value(s), they will share same corresponding tokens as well. The tokens for $q_i$ will also access I to get candidate ids, defined as the access pattern $\mathcal{L}_3^{\Pi_1}(q_i) = (\{\langle x, y \rangle, id\}_{\#R})$, where R is the set of candidate ids, and #R denotes its size. Accordingly, after all the query points are processed, the distribution X of $Q$ might be fully disclosed. Specifically, X is formalized as $\chi = (C_1, \ldots, C_{n_t})$, where $n_t$ is the number of distinct tokens, $C_i$ is the number of occurrences of token $t_i$. Knowing X allows the server to obtain information about the clusters of similar points in $Q$. Such information might be exploited to recover the entire $Q$ in the worst case, when the adversary controls a referenced query dataset (e.g., the partial or full image of $Q$).

Based on the above leakage functions, following the simulation-based security notion (see D. Cash, J. Jaeger, S. Jarecki, C. Jutla, H. Krawczyk, M.-C. Rosu, and M. Steiner, "Dynamic searchable encryption in very large databases: Data structures and implementation, *In Proc. of NDSS*, 2014, R. Curtmola, J. Garay, S. Kamara, and R. Ostrovsky, "Searchable symmetric encryption: improved definitions and efficient constructions,"*In Proc. of ACM CCS*, 2006, and S. Kamara, C. Papamanthou, and T. Roeder, "Dynamic searchable symmetric encryption,"*In Proc. of ACM CCS*, 2012, the disclosure if which is incorporated herein by reference), a probabilistic polynomial time simulator S can simulate an index, respond to a polynomial number of query points with simulated tokens and results, which are indistinguishable with the real encrypted index, tokens and results respectively. Through such simulation-based security analysis it can be demonstrated that the storage system only knowns the above precisely defined leakage for a set of adaptive queries, and no other information. With this information, the storage system cannot obtain the underlying content of data points and query points. Accordingly, an individual similarity query scheme ($\mathcal{L}_1^{\Pi_1}, \mathcal{L}_2^{\Pi_1}, \mathcal{L}_3^{\Pi_1}$) of embodiments is secure against adaptive chosen-keyword attacks in the random oracle model if (KGen, Enc, Dec) is CPA-secure, and F, $P_1$, and $P_2$ are PRF.

From the foregoing, it should be appreciated that an individual similarity query scheme of embodiments of the invention may be relatively easily implemented, enabling the storage system to directly find the candidates without knowing the underlying content, and does not require any additional storage at the client system. However, when the query dataset is large, the query cost can be expensive. In particular, since each query point with l tokens in $Q$ is processed individually, the bandwidth complexity and the time complexity are both O(lm), where l is the number of LSH functions and m is the size of $Q$. Accordingly, embodiments of the invention may utilize additional or alternative secure query schemes, such as may be adapted to provide strong protection of the query dataset.

A frequency hiding query scheme (also denoted as $\Pi_2$ herein) of embodiments provides queries such that the storage system only sees the flattened distribution. In particular, the redundancy in the tokens that may cause the distribution of the full query dataset to be disclosed is avoided in operation of a frequency hiding query scheme of embodiments. In arriving at a frequency hiding query scheme of embodiments of the invention, it was realized that query points may share same LSH values as well as tokens and that the repeated tokens not only consume redundant computation power of the server, but also the similarity between query points. In light of the foregoing, a frequency hiding query scheme is operable to filter redundant tokens that have been queried before.

Figure 3:
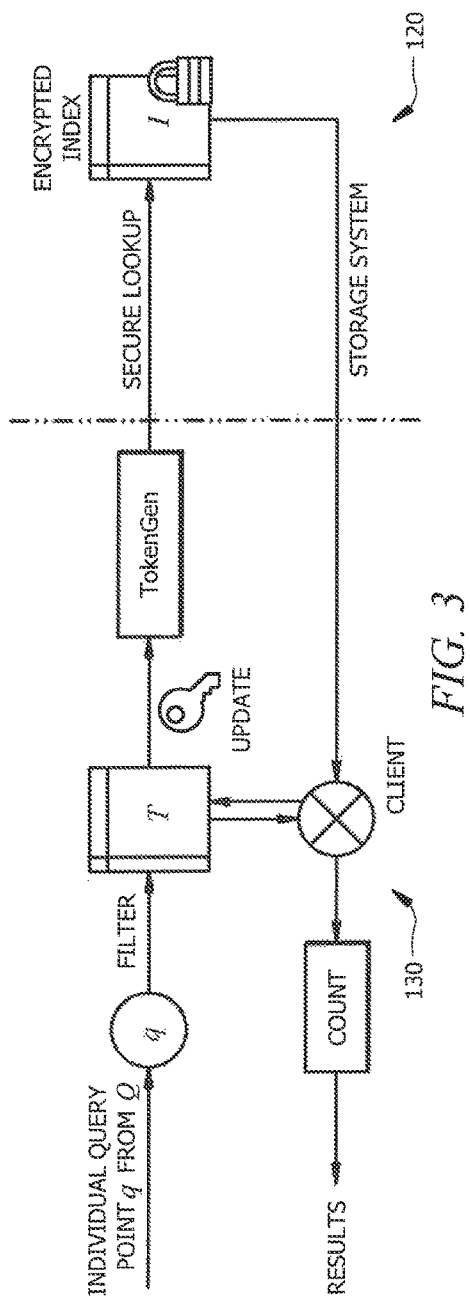
FIG. 3 illustrates operation of components of the system of FIG. 1 in accordance with a frequency hiding query of embodiments of the invention.

FIG. 3 illustrates operation in accordance with a frequency hiding query of embodiments of the invention, such as may be provided through functionality of one or more modules of storage system 120 and client system 130. In operation according to embodiments, client system 130 operates to filter the redundant tokens that have previously been queried. As a result, storage system 120 only sees distinct tokens and passively returns the matched identifiers. Client system 130 implementing embodiments of the frequency hiding query scheme maintains local storage to cache the intermediate results (e.g., the matched identifiers for every queried token). In operation according to the illustrated embodiment of a frequency hiding query scheme, the candidates are obtained via collision counting locally at client system 130.

Algorithm 3 below shows detailed operation of a frequency hiding query as may be implemented according to embodiments of the invention. In operation according to Algorithm 3, client system 130 computes $\{LshV\}_l$ for each $q_i$. However, in contrast to operation of an individual similarity query scheme as described above, client system 130 additionally maintains a hash table T to cache the appeared LshV and the ids of matched data points in a set R'. When LshV is repeated, client system 130 will directly access T locally. Tokens $t_1$ and $t_2$ will be only generated for new, non-redundant LshV, according to embodiments. Storage system 120 receives the new, non-redundant LshV tokens and processes the encrypted index I to return the matched ids in R'. When all matched ids of $q_i$ are obtained, client system 130 of embodiments will count the number of occurrences $f$ and find the candidates based on the collision threshold $\alpha$.

---

Algorithm 3: Frequency hiding similarity join $\Pi_2$
Data: Private keys: K = ($K_1, K_2$); Encrypted index: I;
 Query set: Q = $\{q_1,...,q_m\}$; Hash table: T;
 Empty set: R',
Result: Pairwise similar data records R.
CLIENT:
1  for i ← 1 to m do
2       for j ← 1 to l do
3          LshV ← $h_j(q_i)$;
4          if T.get(LshV‖j) ≠ null then
5             Add T.get(LshV‖j) to R';
6          else
             // OPRF runs with the data owner;
             $t_1$← OPRF. $P_1(K_1, 1‖ LshV ‖j)$;
7             $t_2$← OPRF. $P_2(K_2, 2‖ LshV ‖j)$;
             SERVER:
8             c ← 0
9             while I.get(F($t_1$,c)) ≠ null do
10              id ← Dec($t_2$, I.get(F($t_1$,c)));
11              c + +
12              Add id to R';

-continued

```
                  |    // send R' to the client for the update;
13         |      |    T.put(LshV∥j,R');
           |
           CLIENT:
14         T.put(LshV∥j,R');
15         ∀id ∈ R': count the number of occurrences f;
16         if f > α, then
17              Add (q_i,id) to R;
```

As discussed above, tokens $t_1$ and $t_2$ may be generated through a secure two-party computation protocol OPRF according to embodiments of the invention. Accordingly, in operation according to embodiments, the data owner with $K_1$ and $K_2$ and the client with LshV jointly computes the outputs of PRF $P_1$ and $P_2$ without knowing the input of each other. Such operation enables the authorized secure queries while preventing the data owner from learning the client's proprietary query points.

As can be appreciated from the foregoing, embodiments implementing a frequency hiding query scheme realize enhanced security. In particular, the storage system can no longer learn the distribution of $\mathcal{Q}$. In operation according to embodiments of such a frequency hiding query scheme, the distribution X I' is strictly flattened such that every $C_i$ in X' is equal to 1. Therefore, even if an adversary has the knowledge about the original X, X cannot be mapped back to X'. Furthermore, the similarity between query points are protected according to embodiments because no redundant token will be queried and all the tokens are anonymized. In this case, the query pattern only contains the distinct tokens, as may be quantified as $\mathcal{L}_2^{\Pi 2}(Q)=(t_1, \ldots, t_{n_t})$ As a result, a frequency hiding query scheme of embodiments herein minimizes the leakage for the secure similarity join query, and both the content and the auxiliary information of the query dataset are protected.

It should be appreciated that implementation of a frequency hiding query scheme according to embodiments herein greatly reduces the storage system query costs and the bandwidth cost (e.g., as compared to embodiments of the individual similarity query scheme discussed above), because it eliminates the redundancy of the tokens locally at the client system. In particular, the bandwidth and the time complexity are $O(n_t)$, where $n_t$ is the number of distinct tokens of $\mathcal{Q}$, and the saving is denoted as $ml-n_t$. The more the tokens are repeated, the more the query cost and bandwidth cost savings will be. Exemplary results show that the savings reach over 95% for datasets with high density, for example.

Although a frequency hiding query scheme of embodiments provides enhanced security and improved storage system side efficiency, the client system of the exemplary embodiment described above maintains an additional hash table T to cache the intermediate results. The space complexity of T is $O(n_t \#R'_{max})$, where $\#R'_{max}$ is the maximum size of R'. Moreover, the collision counting for candidate selection is conducted by the client system of the exemplary embodiment described above. Therefore, utilization of embodiments of a frequency hiding query scheme may not be desirable in certain situations, such as where the client system has limited computing and/or storage resources. Accordingly, embodiments of the invention may utilize additional or alternative secure query schemes, such as may be adapted to achieve security and efficiency simultaneously.

A result sharing query scheme (also denoted as $\Pi_3$ herein) of embodiments provides operation to process a portion of query points and share the results with other nearby points to obfuscate the distribution X, reduce client cost, and thus provide security and efficiency simultaneously. Embodiments of a result sharing query scheme as may be implemented according to embodiments herein are adapted to achieve practical performance at the client and the storage systems, minimize leakage of the query dataset, and introduce little loss on accuracy.

Figure 4:
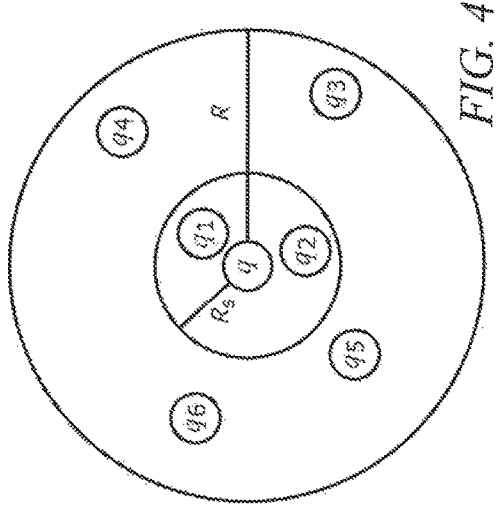
FIG. 4 illustrates points in a query dataset that may share the same result candidates from the source dataset in accordance with a result sharing query scheme of embodiments of the invention.

In arriving at the result sharing query scheme of embodiments of the invention, it was realized that some very close points in the query dataset may share the same result candidates from the source dataset, as illustrated in FIG. 4. Therefore, a large portion of similar query points can be skipped according to embodiments by reusing correlated query candidate sets. It was further realized that the skipped similar query points also share a large number of LSH hash values, and thus a large portion of resulting query tokens may be the same and need not be sent repeatedly. Accordingly, in operation of a result sharing query scheme of embodiments herein, the distribution of the selected representative query points will be different from the original distribution of query dataset, making the query pattern very difficult if not impossible to be exploited for potential attacks.

Figure 5:
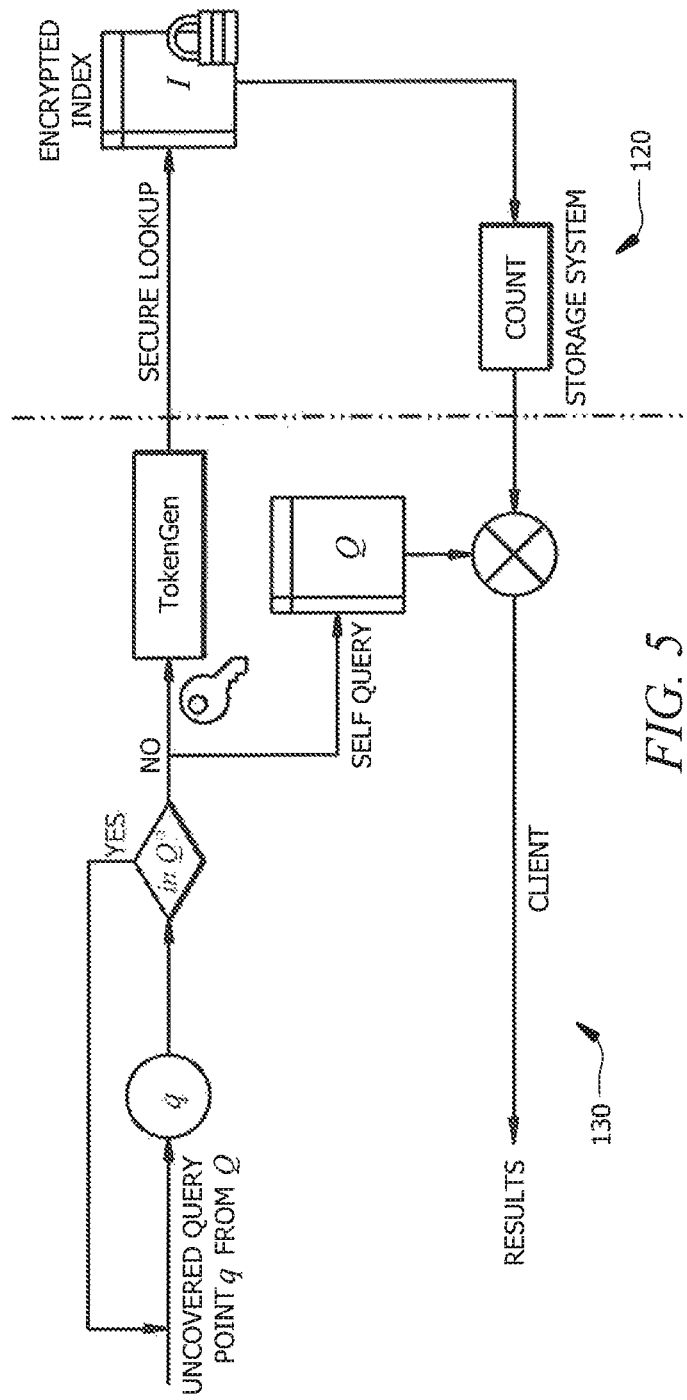
FIG. 5 illustrates operation of components of the system of FIG. 1 in accordance with a result sharing query of embodiments of the invention.

FIG. 5 illustrates operation in accordance with a result sharing query of embodiments of the invention, such as may be provided through functionality of one or more modules of storage system 120 and client system 130. In operation according to embodiments, client system 130 operates to conduct a self-query q to get similar points $\{q_s\}$, which share the results of q, such that only a small portion of query points are processed and their results are shared with other nearby points.

Algorithm 4 below shows detailed operation of a result sharing query as may be implemented according to embodiments of the invention. In operation according to Algorithm 3, client system 130 randomly selects a query point $q_i$ as a representative query point. Client system 130 may then conduct a self-query to find a group of similar query points $\{q_s\}$ to $q_i$, which are all added to a set $\mathcal{Q}$. Tokens $t_1$ and $t_2$ may be generated via the OPRF protocol with the data owner. Storage system 120 receives $\{t_1, t_2\}_i$ and processes the encrypted index I via collision counting to return the matched ids in R'. In operation according to algorithm 4, the candidates for $q_i$ are also shared with the self-query result $\{q_s\}$. Accordingly, for the subsequent query points, client system 130 will select representatives from the set $\mathcal{Q} \backslash \mathcal{Q}$. If the randomly selected query points are already in $\mathcal{Q}$, it will be skipped. Otherwise, they will be treated as the representatives, wherein the procedure described above with respect to a first query point will be executed. In operation according to embodiments, the above procedure will iterate until all the query points are added to $\mathcal{Q}$. Finally, all the query points will obtain the similar candidates from the target dataset.

```
Algorithm 4: Result sharing secure similarity join Π_3
Data: Private keys: K = (K_1, K_2); Encrypted index: I;
      Query set: Q = {q_1,...,q_m}; Hash table: T;
      Empty set: R'.
Result: Pairwise similar data records R.
CLIENT:
1  Initialize a set Q;
2  while Q ≠ Q do
3  |    Randomly select q_i ∈ Q;
4  |    if q_i ∉ Q then
```

```
              Q.put(q_i);
5             for j ← 1 to l do
6                LshV ← h_j(q_i);
7             Find all similar {q_s} to q_i; and Q.put({q_s});
8             for j ← 1 to l do
                     t_1 ← OPRF. P(K_1, 1||LshV||j);
9                    t_2 ← OPRF. P(K_2, 2||LshV||j);
              SERVER:
10                   c ← 0
11                   while I.get(F(t_1,c)) ≠ null do
12                      id ← Dec(t_2, I.get(F(t_1,c)));
13                      c + +
14                      if T./get(id) = null then
15                         T.put(id.0) ← 0;
16                      else
                           f ← T.get(id);
                           T.put(id, f + +);
17                      if f > α then
18                         add (id) to R';

CLIENT:
19            ∀id ∈ R', add {(q_s,id)} to R; // result sharing;
```

The leakage profiles are not useful in compromising the confidentiality of the query dataset in operation of a result sharing query scheme of embodiments herein. In operation of a result sharing query scheme of embodiments, the representative query points may be processed such that the similarity query pattern $\mathcal{L}_2^{\Pi 3}$, discussed above, is known. Moreover, an adversary can also obtain the distribution of those representative query points denoted as $x'=(C'_1, \ldots, C'_{n_t})$, where $n_t$ is the number of distinct tokens, $C'_i$ is the number of occurrences of token $t_i$. However, in light of the shared query points, recovery of the query dataset from this information is improbable. For example, in conducting a leakage-abuse attack, an adversary will try to investigate X' and X to link the tokens with plaintext LSH values (e.g., matching the normalized elements after ordering). For the purposes of analyzing such a leakage-abuse attack, it may be assumed that the adversary has the token distribution with the same distance threshold R as querying the source dataset and that the attack can be launched using same LSH parameters. Considering the case for one representative query depicted in FIG. 4, the adversary can recover the tokens of the query points $\{q, q_1, q_2\}$ only if the query does not share any LSH values with $\{q_3, q_4, q_5, q_6\}$. Only under such a condition, skipping $q_1$ and $q_2$ will not affect the token distribution of the above query points. Namely, the adversary sees the same distribution as shown in the original query dataset. From the definition of LSH provided above, the probability that two similar points do not collide in one LSH function is equal to $1-p_1$, where $p_1$ is the collision probability. For l LSH functions, the probability is equal to $(1-p_1)^l$. Using b to denote the number of query points within the distance threshold of self-queries in the query dataset, the probability that those skipped queries do not have LSH collisions with a certain point within R is equal to $(1-p_1)^{lb}$. Accordingly, the probability P that the skipped queries do not have LSH collisions with all points within R satisfies $P<(1-p_1)^{lb}$. As an example, if $p_1=0.9$ and $l=300$, P is negligible. In practice, there exists a number of such clusters in the query dataset, and thus it is even harder to recover all of them. In practice, it is expected that the recovery ratio will be less than 1% even if the adversary has full access to X. Moreover, if the query dataset has low density, such that few points are within R, the distribution will be flattened in nature as distant points are not likely to have LSH collisions.

As can be appreciated from the foregoing, secure query schemes implemented according to embodiments of the present invention provide privacy-assured queries with respect to encrypted datasets. Exemplary embodiments as described above provide privacy-assured similarity join techniques operable with large-scale encrypted datasets that enable storage systems to answer similarity join queries without learning the content of the query dataset and the target dataset.

Embodiments of secure query schemes herein are adapted to provide practical and effective solutions with respect to querying encrypted datasets. For example, embodiments are adapted to support secure data dynamic operations for the situation when the source dataset is updated. Embodiments of the invention may adopt any of a number of approaches to accommodate the addition of data points. As one example, the encrypted index may be directly updated securely by generating the corresponding the encrypted key-value pairs. For the new point q, client system 130 may compute $\{F(t_1, c), Enc(t_2, id_i)\}_l$ and request that storage system 120 insert them to the index passively, wherein the counter c may be cached locally to serve the above operation. As another example, as may be suitable for bulk update, a new encrypted index may be created for newly added points (see D. Cash, J. Jaeger, S. Jarecki, C. Jutla, H. Krawczyk, M.-C. Rosu, and M. Steiner, "Dynamic searchable encryption in very large databases: Data structures and implementation," *In Proc. of NDSS*, 2014). For data deletion, a revocation list may be created to record the ids of deleted data points, whereby no update is conducted on the encrypted index. In operation according to embodiments, the index may be periodically rebuilt by merging all the update and the current index together.

In addition to leakage associated with the encrypted index and the query pattern, leakage associated with the access pattern $\mathcal{L}_3$, discussed above, could also be harmful when an adversary gains partial or full knowledge of the source dataset. Accordingly, embodiments of the present invention are adapted to protect access patterns with respect to encrypted dataset queries. The confidentiality of both the query dataset and the source dataset can be compromised based on the auxiliary information like the dataset distribution (see D. Cash, P. Grubbs, J. Perry, and T. Ristenpart, "Leakage-abuse attacks against searchable encryption,"*In Proc. of ACM CCS*, 2015, and M. Islam, M. Kuzu, and M. Kantarcioglu, "Access pattern disclosure on searchable encryption: Ramification, attack and mitigation"*In Proc. of NDSS*, 2012, the disclosures of which are incorporated herein by reference) because the matched results for each token indicate the likely similar points in the dataset. This issue is addressed according to embodiments by a heuristic method in which dummy data points and random padding is added to the dataset and the encrypted index. This countermeasure trades time and space efficiency for stronger security strength. In operation, less than 2× increase in index size can effectively mitigate access pattern based attacks.

Having described exemplary embodiments of the present invention, empirical data for the evaluation of an experimental implementation is provided below to further aid in the understanding of the concepts herein. It should be appreciated that the particulars of the exemplary implementation are not intended to be limiting with respect to the applicability and the operation of the present invention, but instead are provided as a tangible illustration of the application of concepts herein.

In the experimental implementation, one client system instance and one storage system server instance were deployed at Microsoft Azure using the Standard_D12 VMs with 4 cores, 28 GB RAM and 200 GB SSD. Implementations of the above described secure query schemes (i.e., implementations of an individual similarity query scheme ($\Pi_1$) in accordance with Algorithm 2, a frequency hiding query scheme ($\Pi_2$) in accordance with Algorithm 3, and a result sharing query scheme ($\Pi_3$) in accordance with Algorithm 4) were developed by C++ with –O3 optimization. The cryptographic primitives were implemented in OpenSSL v1.1.0, and the transport protocol between the storage system server and the client system was implemented via Apache Thrift v0.9.3. Two datasets, MinibooNE (ME) and Forest Covertype (FC), were used in the experiment, wherein the former dataset includes 130,065 of 50-dimensional vectors representing electron or moon neutrinos and the latter dataset includes 131,204 of 10-dimensional vectors representing regions in forests in the Rocky Mountain area. The experimental implementation utilized the C2LSH parameter setting described in J. Gan, J. Feng, Q. Fang, and W. Ng, "Locality-sensitive hashing scheme based on dynamic collision counting,"*In Proc. of ACM SIGMOD*, 2012, getting l=300 for both datasets and collision threshold $\alpha_{ME}$=131, $\alpha_{FC}$=124 respectively.

To demonstrate the security strength of the foregoing secure query schemes, an exemplary real-world attack was implemented based on the recent leakage-abuse attacks reported in D. Cash, P. Grubbs, J. Perry, and T. Ristenpart, "Leakage-abuse attacks against searchable encryption"*In Proc. of ACM CCS*, 2015). In particular, the attack was designed in the application of searchable encryption in keyword search. Assuming that an adversary knows the number of matched documents for each keyword in a targeted document set, the adversary can recover the query keyword from the leakage profile (i.e., the number of matched encrypted documents). Accordingly, in the experimental implementation it is assumed that the adversary knows the number of matched query points for each distinct LSH value in the query dataset, as LSH values are treated as "keywords". In the attack, the adversary aims to link the LSH values to the tokens by matching the distribution of observed tokens to the known distribution of tokens.

Figure 6A:
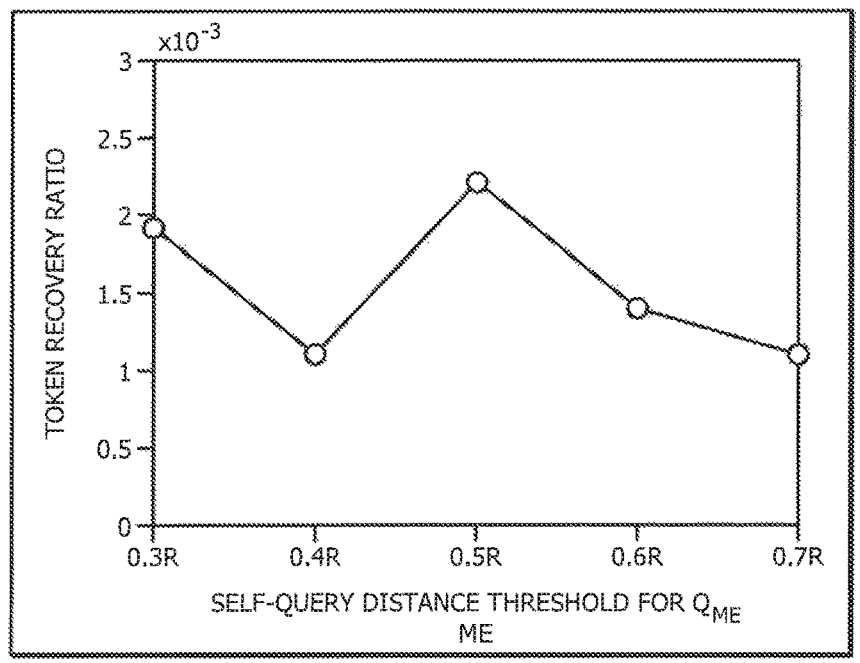
FIGS. 6A and 6B illustrate example results from operation of a result sharing query scheme implemented according to embodiments of the invention.
Figure 6B:
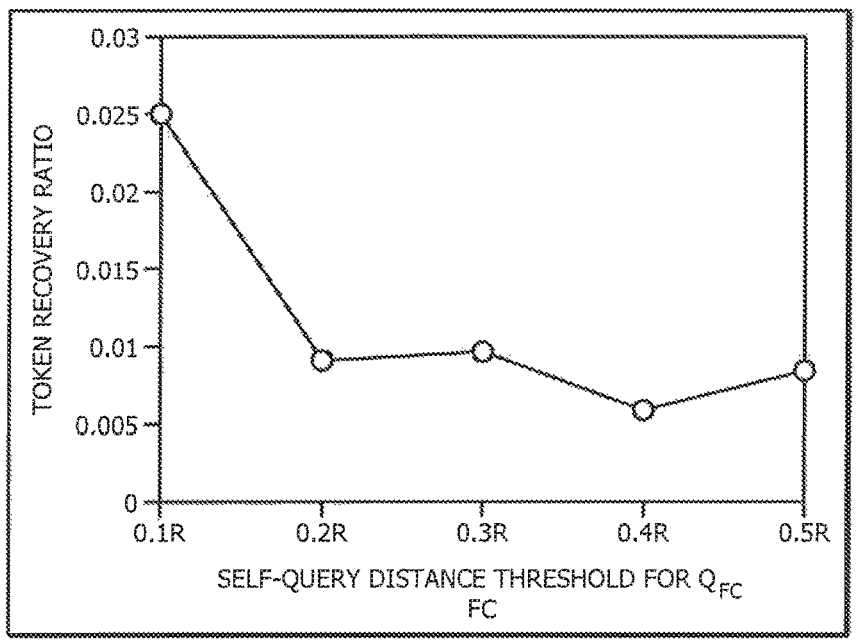

The above token matching attack is implemented in Algorithm 5 below. Both the query dataset token distribution X and the observed token distribution X' are normalized, and the elements in X and X' are sorted respectively. For each pair of ordered elements in two sets, if they match to the same token, the adversary is considered to recover it. As discussed above, an individual similarity query scheme of embodiments does not protect X, where X' is exactly the same as X. Also as discussed above, a frequency hiding query scheme of embodiments fully protects X such that all elements in X' are equal to 1. Thus, the analysis of the example implementation mainly evaluates the security strength for a result sharing query scheme of embodiments herein. In evaluating the security strength, 10% of the points in two datasets are chosen to simulate two query datasets respectively (i.e., $Q^{ME}$ and $Q^{FC}$). As shown in FIGS. 6A and 6B, a result sharing query scheme implemented according to embodiments herein effectively defends against the token matching attack. In particular, the token recovery ratios on $Q^{ME}$ and $Q^{FC}$ under different self-query distance thresholds are less than 0.25% and 3% respectively. These results demonstrate that even if the adversary knows full distribution of the query dataset, the query dataset is not likely recoverable.

```
Algorithm 5: Token matching attack
Data: Query set token distribution: X = (C_{l_j}, ..., C_{l_n});
      Observed token distribution: X = (C'_{l_j}, ..., C'_{l_n})
Result; Recovery ratio μ.
1   for i ← 1 to n_l do
2     ⌈ C_{l_j} ← C_{l_j} / Σ_{i-1}^{n_i} C'_{l_j};
3     ⌊ C'_{l_j} ← C'_{l_j} / Σ_{i-1}^{n_i} C'_{l_j};
4   Sort (C_{l_j},...,C'_{l_n}) and (C'_{l_j},...,C'_{l_n});
5   j ← 0
6   for i ← 1 to n_l do
7     ⌈ if t_i and t'_i matches to the same LSH value, then
      ⌊ j + +;
8   μ ← j/n_l.
```

To understand the benefits of the different secure query schemes of embodiments herein, evaluations of setup time, query costs, bandwidth consumption, and result accuracy were conducted. Table I below shows the setup time of building the encrypted index of the example implementation (i.e., 1 s for ME and 534 s for FC). It should be appreciated that the setup time for building the encrypted index is essentially a one-time cost to enable secure similarity joins. Using SHA256 as the implementation of PRF and AES-128 as the block cipher, each encrypted key-value pair is 384-bit long. In this example, the total ln pairs are inserted to a generic bucket hash table with a load factor 70%, and the space cost is approximately 2.6 GB for 106 data points.

TABLE I

Cost of the encrypted index

| Dataset | Build time (s) | Index size (MB) |
|---------|----------------|-----------------|
| ME      | 541.41         | 2675.62         |
| FC      | 534.35         | 2699.05         |

Figure 7:
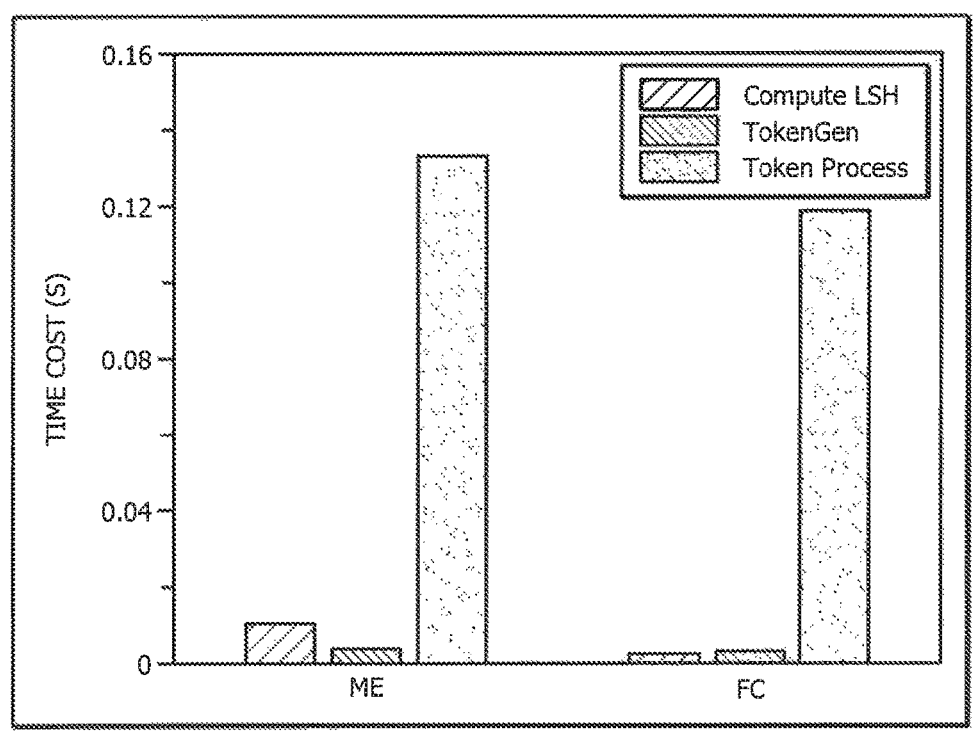
FIG. 7 illustrates the average per token processing time for randomly selected tokens in operation of exemplary secure queries according to embodiments of the invention.

With regard to query performance, FIG. 7 shows the average per token processing time for 100 randomly selected tokens, including the time for computing LSH hash values (ComputeLSH), generating the token via PRF (TokenGen), and processing the tokens over the encrypted index (TokenProcess). As shown in the results of FIG. 7, the time of TokenProcess dominates the cost for token processing, which increases linearly with the number of matched ids. ComputeLSH takes a longer time when the dimension of data points is larger. TokenGen can be very fast in commodity servers (i.e., within 1 ms per SHA256).

Figure 8A:
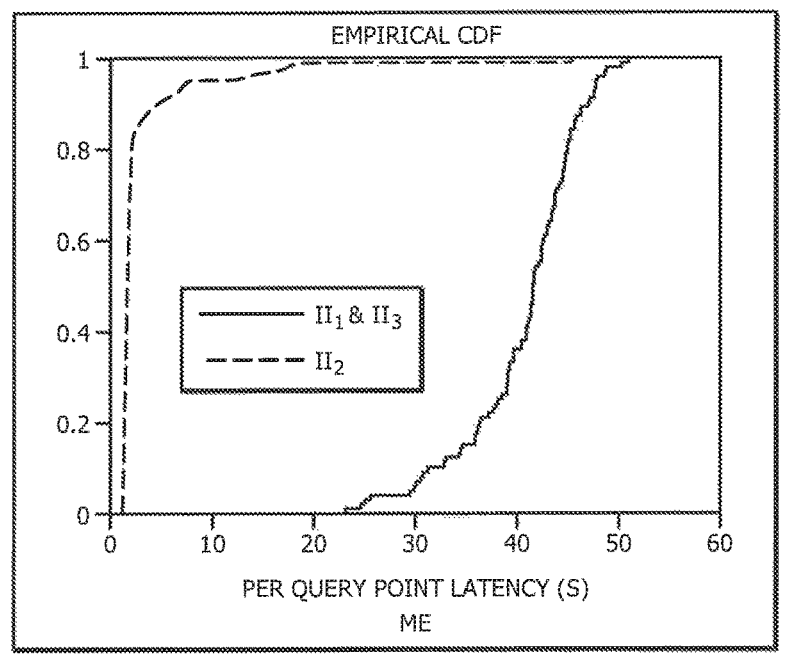
FIGS. 8A and 8B illustrate the per query point processing time for randomly selected query points in operation of exemplary secure queries according to embodiments of the invention.
Figure 8B:
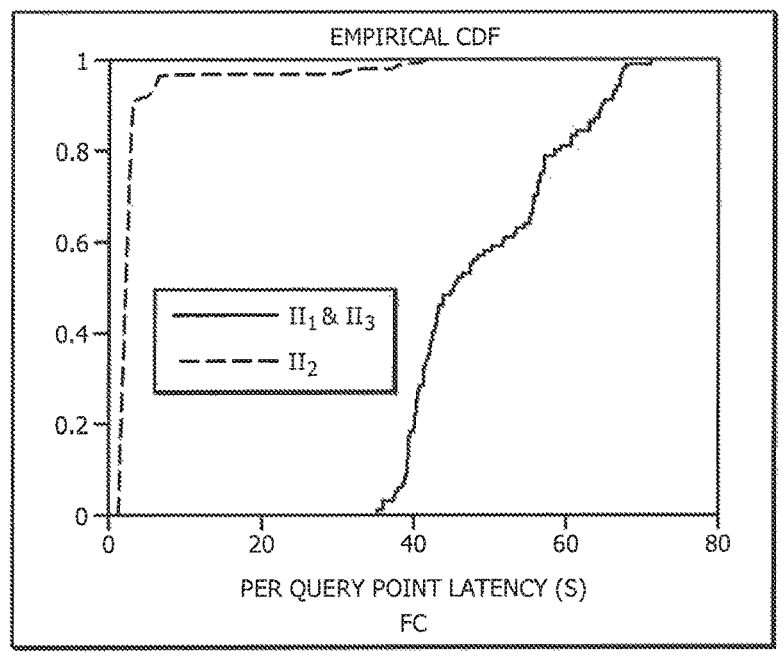

FIGS. 8A and 8B show the per query point processing time for 100 randomly selected query points. As above, 10% of the points in two datasets were chosen to simulate two query datasets respectively (i.e., $Q^{ME}$ and $Q^{FC}$). In an individual similarity query scheme and result sharing query scheme of embodiments, the query point is processed in the same way (e.g., processing all l tokens and performing LSH collision courting in the storage system server), while in a frequency hiding scheme of embodiments, if some token is processed, the intermediate result will be cached at the client system. As depicted in FIGS. 8A and 8B, the latency per query point in the example individual similarity query scheme and the example result sharing query scheme varies from 20 s to 60 s, depending on the number of matched ids; while the latency in the example frequency hiding query scheme is much smaller for a large portion of query points due to the local cache, and only collision counting is conducted at the client system.

Table II below shows the performance of the individual similarity query scheme, the frequency hiding query scheme, and the result sharing query scheme of the example implementation. As can be seen in FIGS. 8A and 8B, the individual similarity query scheme of the example implementation is most expensive because it requires processing all the points in the query dataset. Although the frequency hiding query scheme of the example implementation finishes similar joins with much less time than the individual similarity query scheme, it maintains a large cache at the client as shown in Table III below, because all the matched ids of queried tokens are stored. For the result sharing query scheme of the example implementation, the fewer query points that are selected as the representatives (setting the radius $R_s$ for self-queries in the example as 50% $R_{ME}$ and 30% $R_{FC}$ of C2LSH in two query datasets respectively), the more saving will be gained. Additionally, the time cost of the example result sharing query scheme is much smaller than that of the example individual similarity query scheme. Because of self-queries, around 15% points in $Q^{ME}$ are really queried, and only 3% points in $Q^{FC}$ are processed.

TABLE II

Performance of the proposed query schemes

| Query set | $\Pi_1$ time (s) | $\Pi_2$ time (s) | $\Pi_3$ time (s) | $\Pi_3$ ratio |
|---|---|---|---|---|
| $Q^{ME}$ | 519080 | 23204 | 87412 | 15% |
| $Q^{FC}$ | 745900 | 19646 | 18433 | 3% |

TABLE III

Client storage overhead

| Scheme | $\Pi_2$ cache (MB) | $\Pi_3$ cache (MB) |
|---|---|---|
| $Q^{ME}$ | 155 | 0.05 |
| $Q^{FC}$ | 157 | 0.05 |

The client storage overhead and the bandwidth consumption were measured to better understand the security overhead introduced in the secure query schemes of embodiments herein. Because the example individual similarity query scheme processes all the query points in the query dataset individually, the client system does not need the local cache. As shown in Table III above, the example frequency hiding query scheme caches all the appeared tokens and the intermediate results (e.g., the ids of matched candidates). This local cache consumed over 150 MB in the experimental implementation. In the example result sharing query scheme only a set Q is needed to check whether all the points in the query dataset are covered by the self-queries, which stores all ids in the query dataset at most (e.g., approximately 0.05 MB for around 1, 300 points). Table IV below, showing bandwidth consumption, shows that the example individual similarity query scheme is the most bandwidth consumptive out of the example secure query schemes. The example frequency hiding query scheme requires the storage system server to return all the matched ids for the queried tokens, whereas in the example result sharing query scheme the storage system server only returns the candidates for representative points after the collision counting. Accordingly, the bandwidth consumption depends on how many number of points are really queried and, in the experiment conducted, the example result sharing query scheme was the most bandwidth efficient.

TABLE IV

Bandwidth consumption

| Query set | $\Pi_1$ (MB) | $\Pi_2$ (MB) | $\Pi_3$ (MB) |
|---|---|---|---|
| $Q^{ME}$ | 617 | 155 | 22 |
| $Q^{FC}$ | 2011 | 157 | 56 |

Figure 9A:
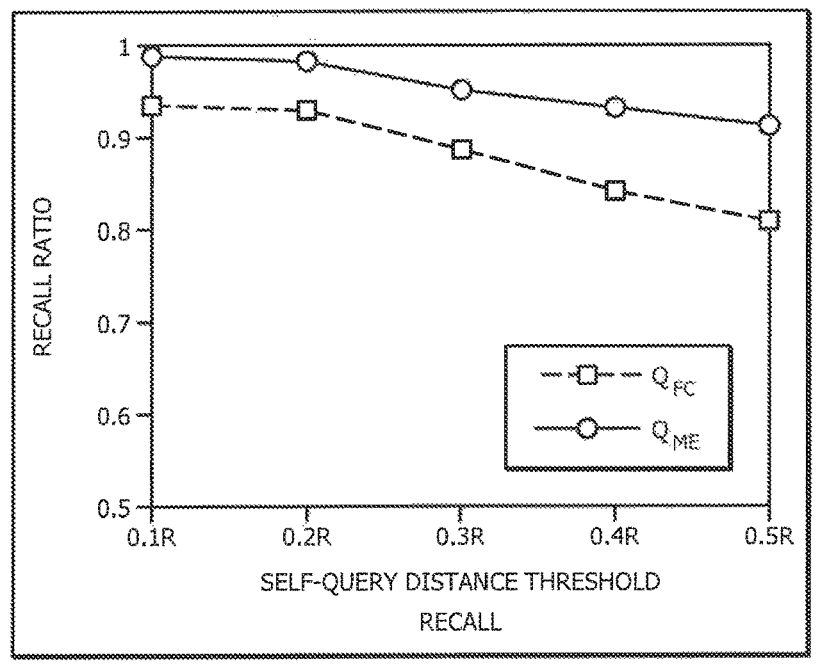
FIGS. 9A and 9B illustrate the similarity search recall and precision metric results in operation of exemplary secure queries according to embodiments of the invention.
Figure 9B:
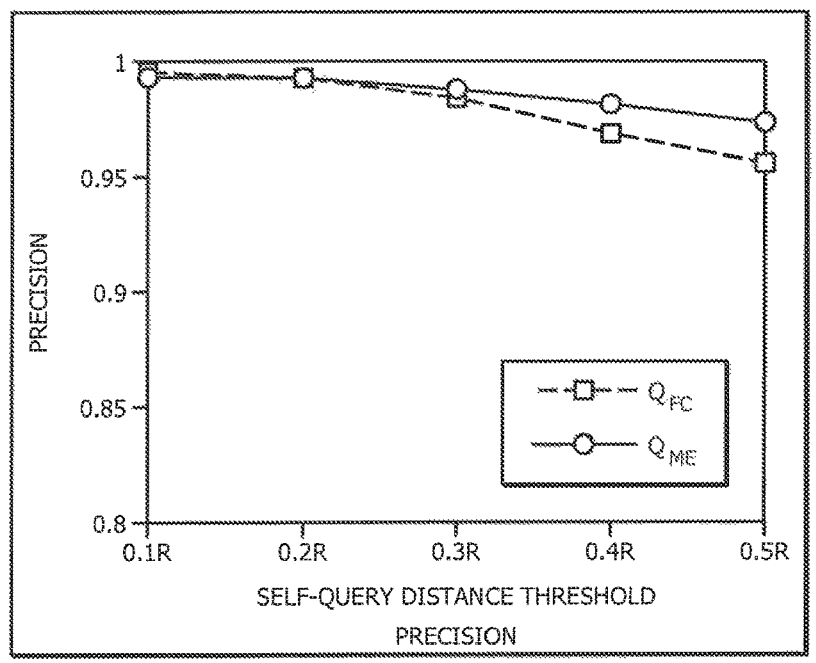

Two common metrics for similarity search, recall and precision (see J. Gan, J. Feng, Q. Fang, and W. Ng, "Locality-sensitive hashing scheme based on dynamic collision counting," In Proc. of ACM SIGMOD, 2012), were used to evaluate the query accuracy. Recall is defined as the fraction of the similar points within the distance threshold returned by the proposed query schemes and precision is defined as the approximation ratio between kNN points from the proposed query schemes and real kNN points (i.e., $$\frac{1}{k} \sum_{i=1}^{k} \frac{\|q - q_i\|}{\|q - q_i^*\|},$$

where q is the query point, $q_i$ is the rank-i point, and $q^*_i$ is the real rank-i point). FIG. 9A shows average recall and FIG. 9B shows average precision of query points used in secure similarity joins. As can be seen in FIGS. 9A and 9B, the example individual similarity query scheme and the example frequency hiding query scheme achieve high quality query results (it being appreciated that these secure query schemes do not affect the accuracy of C2LSH). Also as can be seen in FIGS. 9A and 9B, the example result sharing query scheme, sharing results with nearby query points, introduces a little loss of accuracy. It should be appreciated, however, that the smaller $R_s$ is, the smaller the accuracy loss is. When $R_s$ is set no greater than 20% of the query distance threshold R, the recall ratios for two query datasets reach over 90%, and the precisions reach 0.99. However, when $R_s$ is smaller, more representative query points will be selected, and the query ratio will become larger.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing secure queries of encrypted datasets, the method comprising:
   storing, by a processor-based storage system, an encrypted similarity index for a source dataset;
   processing, by the processor-based storage system, secure tokens of a secure query using a similarity join process on the encrypted similarity index to identify one or more pairwise encrypted similar data records, wherein the secure tokens are generated from a query dataset, wherein processing the secure tokens of the secure query using a similarity join process comprises processing the secure tokens over the encrypted similarity index to identify collided data points; and identifying, by the processor-based storage system, a pairwise encrypted similar data record of the one or more pairwise encrypted similar data records as a candidate pair for indicating data of an encrypted dataset relative to the secure query without learning content of the query dataset and the source dataset, wherein identifying the pairwise encrypted similar data record filters the collided data points for identifying the candidate pair by determining that a number of collisions for a data point of the collided data points is greater than a predefined threshold.

2. The method of claim 1, further comprising:
generating the encrypted similarity index using a locality-sensitive hashing (LSH) based inverted index, wherein each LSH hash value of the LSH based inverted index are treated as keywords and link to a list of identifiers of data points of the encrypted dataset.

3. The method of claim 2, wherein generating the encrypted similarity index utilizes a searchable symmetric encryption (SSE) based encrypted dictionary.

4. The method of claim 2, wherein the LSH based inverted index includes a set of encrypted key-value pairs stored on top of a dictionary.

5. The method of claim 1, further comprising:
generating a set of secure tokens from query points of the query dataset, wherein the secure tokens of the secure query processed using the similarity join process comprise one or more secure tokens of the set of secure tokens.

6. The method of claim 5, wherein generating the set of secure tokens from the query points of the query dataset comprises:
generating the set of secure tokens from LSH hash values of query points of the query dataset.

7. The method of claim 5, wherein the secure query comprises an individual similarity query in which the one or more secure tokens of the set of secure tokens processed using the similarity join process comprises all secure tokens of the set of secure tokens.

8. The method of claim 5, wherein the secure query comprises a frequency hiding query in which the one or more secure tokens of the set of secure tokens processed using the similarity join process comprises a subset of tokens of the set of secure tokens that are not redundant to previous secure queries.

9. The method of claim 8, further comprising:
processing the set of secure tokens to generate the secure query by filtering secure tokens of the set of secure tokens that are redundant to previous secure queries.

10. The method of claim 5, wherein the secure query comprises a result sharing query in which the one or more secure tokens of the set of secure tokens processed using the similarity join process comprises a secure token for a query data point of the query dataset representative of a plurality of query data points in proximity determined likely to yield similar result sets.

11. The method of claim 10, further comprising:
selecting the query data point of the query dataset; and
performing a self-query to identify similar data points of the query dataset that share result sets.

12. A system for providing secure queries of encrypted datasets, the system comprising:
an encrypted similarity index for a source dataset stored by a storage system; and
storage system server logic configured to cause one or more processors of the storage system to process secure tokens of a secure query using a similarity join process on the encrypted similarity index, to identify one or more pairwise encrypted similar data records, and to identify a pairwise encrypted similar data record of the one or more pairwise encrypted similar data records as a candidate pair for indicating data of an encrypted dataset relative to the secure query without learning content of a query dataset and the source dataset, wherein the secure tokens are generated from the query dataset, wherein the storage system server logic configured to process the secure tokens of the secure query using a similarity join process is configured to process the secure tokens over the encrypted similarity index to identify collided data points, and wherein the storage system server logic configured to identify the pairwise encrypted similar data record is configured to filter the collided data points for identifying the candidate pair by determining that a number of collisions for a data point of the collided data points is greater than a predefined threshold.

13. The system of claim 12, further comprising:
data owner system logic configured to cause one or more processors of a data owner system to generate the encrypted similarity index using a locality-sensitive hashing (LSH) based inverted index, wherein each LSH hash value of the LSH based inverted index are treated as keywords and link to a list of identifiers of data points of the encrypted dataset.

14. The system of claim 13, wherein the data owner system logic configured to cause the one or more processors of the data owner system to generate the encrypted similarity index utilizes a searchable symmetric encryption (SSE) based encryption dictionary.

15. The system of claim 13, wherein the LSH based inverted index includes a set of encrypted key-value pairs stored on top of a dictionary.

16. The system of claim 12, further comprising:
client system logic configured to cause one or more processors of a client system to generate a set of secure tokens from query points of the query dataset, wherein the secure tokens of the secure query processed by the storage system server logic using the similarity join process comprise one or more secure tokens of the set of secure tokens.

17. The system of claim 16, wherein the client system logic configured to cause the one or more processors of the client system to generate the set of secure tokens from the query points of the query dataset is further configured to cause the one or more processors of the client system to generate the set of secure tokens from LSH hash values of query points of the query dataset.

18. The system of claim 16, wherein the secure query comprises an individual similarity query and the storage system server logic is configured to use all secure tokens of the set of secure tokens in the similarity join process.

19. The system of claim 16, wherein the secure query comprises a frequency hiding query and the storage system server logic is configured to use a subset of tokens of the set of secure tokens in the similarity join process, wherein the subset of tokens comprise secure tokens that are not redundant to previous secure queries.

20. The system of claim 19, wherein the client system logic is further configured to process the set of secure tokens to generate the secure query by filtering secure tokens of the set of secure tokens that are redundant to previous secure queries.

21. The system of claim 16, wherein the secure query comprises a result sharing query and the client system logic is configured to a secure token for a query data point of the query dataset representative of a plurality of query data points in proximity determined likely to yield similar result sets.

22. The system of claim 21, wherein the client system logic is further configured to select the query data point of the query dataset and perform a self-query to identify similar data points of the query dataset that share result sets.

23. A method for providing secure queries of encrypted datasets, the method comprising:
   storing an encrypted similarity index for a source dataset, wherein the encrypted similarity index is generated using a locality-sensitive hashing (LSH) based inverted index and a searchable symmetric encryption (SSE) based encrypted dictionary;
   processing secure tokens of a secure query using a similarity join process on the encrypted similarity index to identify one or more pairwise encrypted similar data records from collided data points, wherein the secure tokens are generated from a query dataset using LSH hash values of query points of the query dataset; and
   identifying a pairwise encrypted similar data record of the one or more pairwise encrypted similar data records as a candidate pair using a predefined threshold of collisions for a data point of the collided data points.

24. The method of claim 23, wherein each LSH hash value of the LSH based inverted index are treated as keywords and link to a list of identifiers of data points of an encrypted dataset, and wherein the LSH based inverted index includes a set of encrypted key-value pairs stored on top of a dictionary.

25. The method of claim 23, wherein the secure query comprises an individual similarity query in which the secure tokens of a set of secure tokens processed using the similarity join process comprises all secure tokens of the set of secure tokens.

26. The method of claim 23, wherein the secure query comprises a frequency hiding query in which the secure tokens of a set of secure tokens processed using the similarity join process comprises a subset of tokens of the set of secure tokens that are not redundant to previous secure queries.

27. The method of claim 26, further comprising:
   processing the set of secure tokens to generate the secure query by filtering secure tokens of the set of secure tokens that are redundant to previous secure queries.

28. The method of claim 23, wherein the secure query comprises a result sharing query in which the secure tokens of a set of secure tokens processed using the similarity join process comprises a secure token for a query data point of the query dataset representative of a plurality of query data points in proximity determined likely to yield similar result sets.

29. The method of claim 28, further comprising:
   selecting the query data point of the query dataset; and
   performing a self-query to identify similar data points of the query dataset that share result sets.

* * * * *

UNITED STATES PATENT AND TRADEMARK OFFICE
CERTIFICATE OF CORRECTION

PATENT NO. : 10,496,638 B2
APPLICATION NO. : 15/371953
DATED : December 3, 2019
INVENTOR(S) : Cong Wang et al.

It is certified that error appears in the above-identified patent and that said Letters Patent is hereby corrected as shown below:

In the Specification

At Column 2, Line number 18, delete "which, is indexed" and replace with --which is indexed--.
At Column 4, Line number 60, delete "X, Yuan" and replace with --X. Yuan--.
At Column 5, Line number 6, delete "methods; comparing" and replace with --methods: comparing--.
At Column 6, Line number 63, delete "$F(K;\ x) = H(X)^K$" and replace with --$F(K; x) = H(x)^K$--.
At Column 7, starting at Line number 15, delete "S, Har-Peled" and replace with --S. Har-Peled--.
At Column 12, Line number 57, delete "keys-value pairs" and replace with --key-value pairs--.
At Column 13, Algorithm 1, step 10, delete "$I.put(F(t_1,c), Enc(t_2,id_1))$;" and replace with --$I.put(F(t_1,c), Enc(t_2,id_i))$;--.
At Column 13, Algorithm 1, step 13, delete "$S.put(id_1, Enc(K_3, s_1))$;" and replace with --$S.put(id_i, Enc(K_3, s_i))$;--.
At Column 13, Line number 41, delete "index land" and replace with --index I and--.
At Column 21, Line number 16, delete "moon neutrinos" and replace with --muon neutrinos--.

Signed and Sealed this
Third Day of March, 2020

Andrei Iancu
*Director of the United States Patent and Trademark Office*

At Column 22, Algorithm 5, delete Algorithm 5 and replace with

Algorithm 5: Token matching attack

Data: Query set token distribution: $X = (C_{t_1}, ..., C_{t_{n_t}})$;

Observed token distribution: $X = (C'_{t'_1}, ..., C'_{t'_{n_t}})$

Result: Recovery ratio $\mu$.

1  for $i \leftarrow 1$ *to* $n_t$ do
2  $\quad C_{t_i} \leftarrow C_{t_i} / \sum_{i=1}^{n_t} C_{t_i}$;
3  $\quad C'_{t_i} \leftarrow C'_{t_i} / \sum_{i=1}^{n_t} C'_{t_i}$;
4  Sort $(C_{t_1}, ..., C_{t_{n_t}})$ and $(C'_{t'_1}, ..., C'_{t'_{n_t}})$;
5  $j \leftarrow 0$
6  for $i \leftarrow 1$ *to* $n_t$ do
7  $\quad$ if $t_i$ and $t'_i$ matches to the same LSH value, then
$\quad\quad j++$;
8  $\mu \leftarrow j/n_t$.